US010593006B2

(12) United States Patent
Holmes

(10) Patent No.: US 10,593,006 B2
(45) Date of Patent: Mar. 17, 2020

(54) METHODS OF MANUFACTURING SECURITY DOCUMENTS AND SECURITY DEVICES

(71) Applicant: DE LA RUE INTERNATIONAL LIMITED, Hampshire (GB)

(72) Inventor: Brian William Holmes, Hampshire (GB)

(73) Assignee: DE LA RUE INTERNATIONAL LIMITED, Hampshire (GB)

(*) Notice: Subject to any disclaimer, the term of this patent is extended or adjusted under 35 U.S.C. 154(b) by 0 days.

(21) Appl. No.: 15/740,576

(22) PCT Filed: Jul. 11, 2016

(86) PCT No.: PCT/GB2016/052085
§ 371 (c)(1),
(2) Date: Dec. 28, 2017

(87) PCT Pub. No.: WO2017/009620
PCT Pub. Date: Jan. 19, 2017

(65) Prior Publication Data
US 2018/0186165 A1      Jul. 5, 2018

(30) Foreign Application Priority Data
Jul. 10, 2015   (GB) .................................. 1512118.9

(51) Int. Cl.
*B42D 25/324*     (2014.01)
*B42D 25/29*      (2014.01)
(Continued)

(52) U.S. Cl.
CPC ...... *G06T 1/0014* (2013.01); *B29D 11/00298* (2013.01); *B29D 11/00365* (2013.01);
(Continued)

(58) Field of Classification Search
CPC .................................................. B42D 25/324
See application file for complete search history.

(56) References Cited

U.S. PATENT DOCUMENTS 4,689,291 A * 8/1987 Popovic .................. G03F 7/001
                                                                  359/900
4,892,336 A   1/1990 Kaule et al.
(Continued)

FOREIGN PATENT DOCUMENTS

EP   1 008 616 B1   8/2004
EP   2 767 395 A1   8/2014
(Continued)

OTHER PUBLICATIONS

International Search Report and Written Opinion dated Sep. 23, 2016 in International Application No. PCT/GB2016/052085.
(Continued)

*Primary Examiner* — Kyle R Grabowski
(74) *Attorney, Agent, or Firm* — Oliff PLC

(57) ABSTRACT

A security device is disclosed, comprising forming an array of focussing elements on first region of first surface of focussing element support layer, applying a pedestal layer comprising one transparent material onto first region of first surface of focussing element support layer applying transparent curable material to the pedestal layer or a casting tool carrying surface relief corresponding to focussing elements, over first region forming transparent curable material(s) with the casting tool bringing first surface of focussing element support layer against the casting tool that transparent curable material between the surface relief and the pedestal layer, across first region; and curing transparent curable material(s) on the pedestal layer to retain surface relief in first region; wherein focal length of focussing elements focal plane lies on first surface of focussing element support layer, or
(Continued)

beyond first surface of focussing element support layer relative to the location of array of focussing elements.

13 Claims, 12 Drawing Sheets

(51) Int. Cl.

| | |
|---|---|
| *G06T 1/00* | (2006.01) |
| *B29D 11/00* | (2006.01) |
| *G02B 3/00* | (2006.01) |
| *B42D 25/425* | (2014.01) |
| *B42D 25/45* | (2014.01) |
| *B42D 25/455* | (2014.01) |
| *B42D 25/46* | (2014.01) |
| *B42D 25/355* | (2014.01) |
| *B42D 25/378* | (2014.01) |
| *B42D 25/48* | (2014.01) |
| *B42D 25/342* | (2014.01) |
| *B42D 25/351* | (2014.01) |
| *B41M 3/14* | (2006.01) |
| *G02B 1/04* | (2006.01) |
| *G06T 7/80* | (2017.01) |
| *G06K 9/32* | (2006.01) |
| *H04N 1/00* | (2006.01) |
| *H04N 5/232* | (2006.01) |
| *H04N 5/247* | (2006.01) |
| *B42D 25/23* | (2014.01) |
| *B42D 25/24* | (2014.01) |
| *B42D 25/47* | (2014.01) |

(52) U.S. Cl.
CPC ......... *B29D 11/00442* (2013.01); *B41M 3/14* (2013.01); *B42D 25/324* (2014.10); *B42D 25/342* (2014.10); *B42D 25/351* (2014.10); *B42D 25/355* (2014.10); *B42D 25/378* (2014.10); *B42D 25/425* (2014.10); *B42D 25/45* (2014.10); *B42D 25/455* (2014.10); *B42D 25/46* (2014.10); *B42D 25/48* (2014.10); *G02B 1/041* (2013.01); *G02B 3/005* (2013.01); *G02B 3/0006* (2013.01); *G02B 3/0012* (2013.01); *G02B 3/0031* (2013.01); *G06K 9/3216* (2013.01); *G06K 9/3275* (2013.01); *G06T 7/80* (2017.01); *H04N 1/00267* (2013.01); *H04N 5/23212* (2013.01); *H04N 5/247* (2013.01); *B42D 25/23* (2014.10); *B42D 25/24* (2014.10); *B42D 25/29* (2014.10); *B42D 25/47* (2014.10); *G06K 2009/3225* (2013.01); *G06T 2207/30144* (2013.01)

(56) References Cited

U.S. PATENT DOCUMENTS

| | | | |
|---|---|---|---|
| 6,200,491 B1 * | 3/2001 | Zesch | B41J 2/14008 |
| | | | 216/24 |
| 6,856,462 B1 | 2/2005 | Scarbrough et al. | |
| 2007/0058260 A1 * | 3/2007 | Steenblik | B42D 25/29 |
| | | | 359/626 |
| 2009/0297805 A1 | 12/2009 | Dichtl | |
| 2011/0019283 A1 | 1/2011 | Steenblik et al. | |
| 2012/0274998 A1 * | 11/2012 | Holmes | B42D 25/324 |
| | | | 359/2 |

FOREIGN PATENT DOCUMENTS

| | | | |
|---|---|---|---|
| GB | 2503783 A | 1/2014 | |
| WO | 94/27254 A1 | 11/1994 | |
| WO | 2005/052650 A2 | 6/2005 | |
| WO | 2006/125224 A2 | 11/2006 | |
| WO | 2008/042631 A1 | 4/2008 | |
| WO | 2009/100193 A1 | 8/2009 | |
| WO | 2011/051669 A1 | 5/2011 | |
| WO | 2011/051670 A2 | 5/2011 | |
| WO | 2011/102800 A1 | 8/2011 | |
| WO | 2011/107782 A1 | 9/2011 | |
| WO | 2011/107783 A1 | 9/2011 | |
| WO | 2012/027779 A1 | 3/2012 | |
| WO | 2013/167887 A1 | 11/2013 | |
| WO | WO-2013167887 A1 * | 11/2013 | ............ B42D 25/30 |
| WO | 2014/000020 A1 | 1/2014 | |
| WO | 2014/070079 A1 | 5/2014 | |
| WO | 2014/153595 A1 | 10/2014 | |
| WO | 2015/011493 A1 | 1/2015 | |
| WO | 2015/011494 A1 | 1/2015 | |
| WO | 2015/044671 A1 | 4/2015 | |

OTHER PUBLICATIONS

Search Report dated Jul. 1, 2016 in United Kingdom Patent Application No. GB1609049.0.
Combined Search and Examination Report dated Dec. 23, 2016 in United Kingdom Application No. GB1612022.2.
Examination Report dated Aug. 9, 2017 in United Kingdom Patent Application No. GB1612022.2.
International Preliminary Report on Patentability dated Jan. 16, 2018 in International Application No. PCT/GB2016/052085.

* cited by examiner

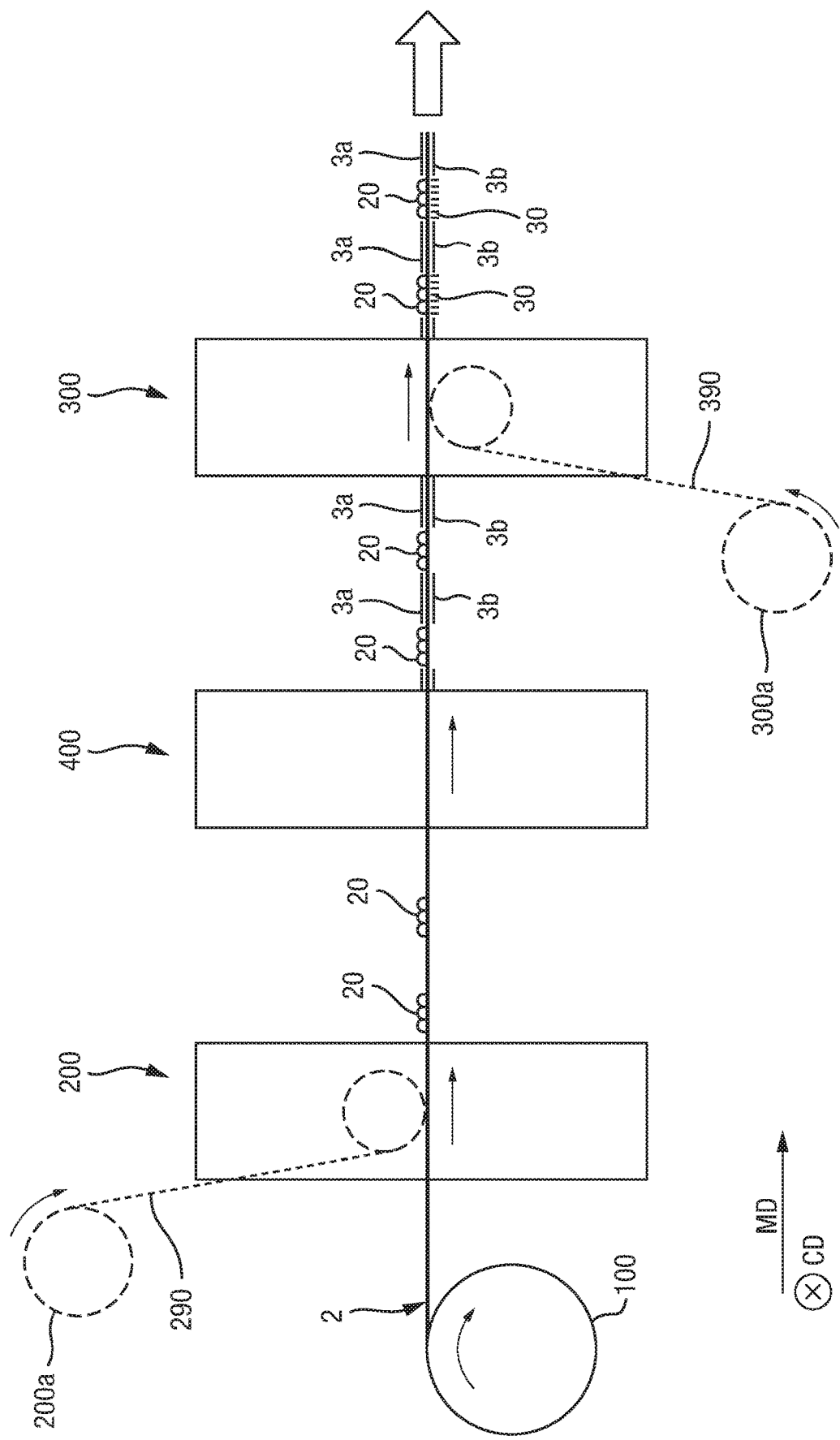

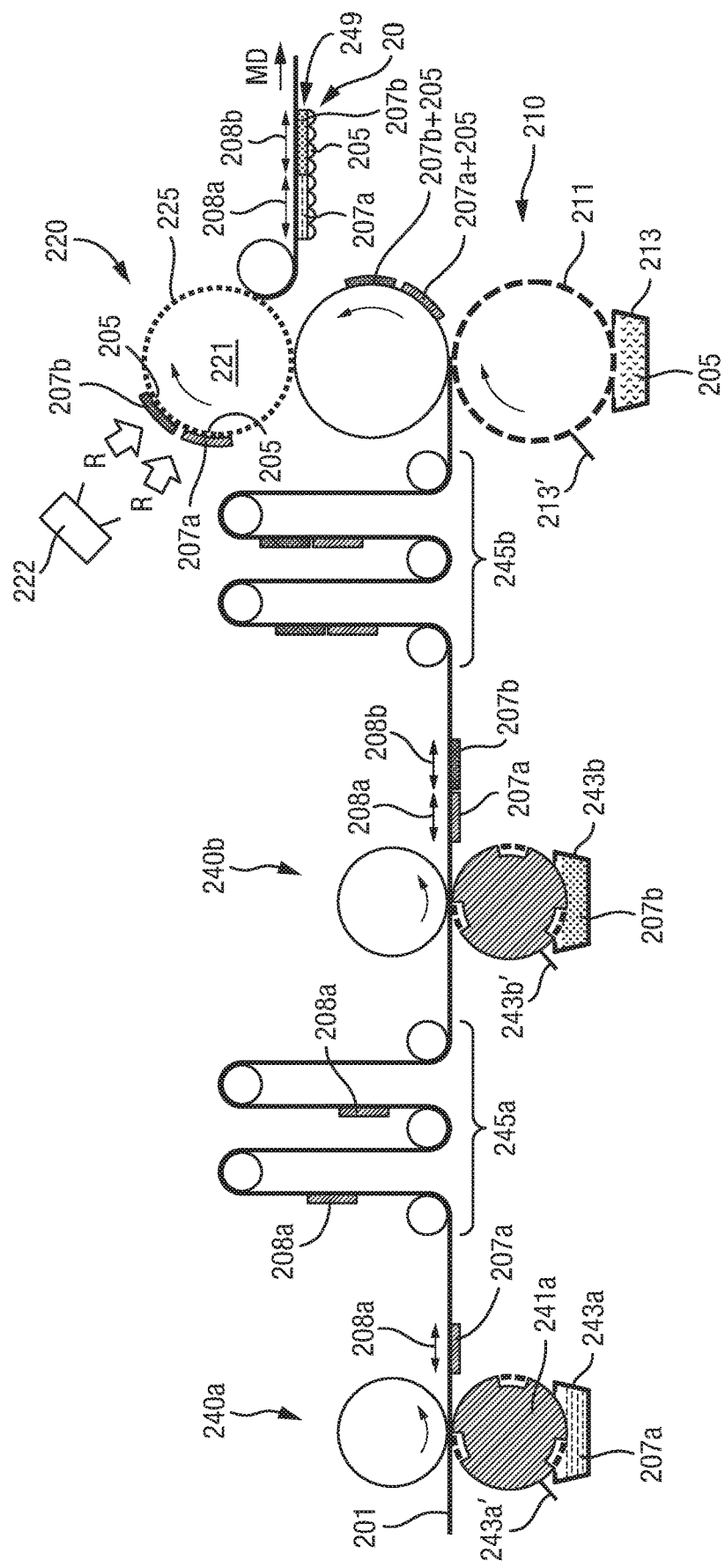

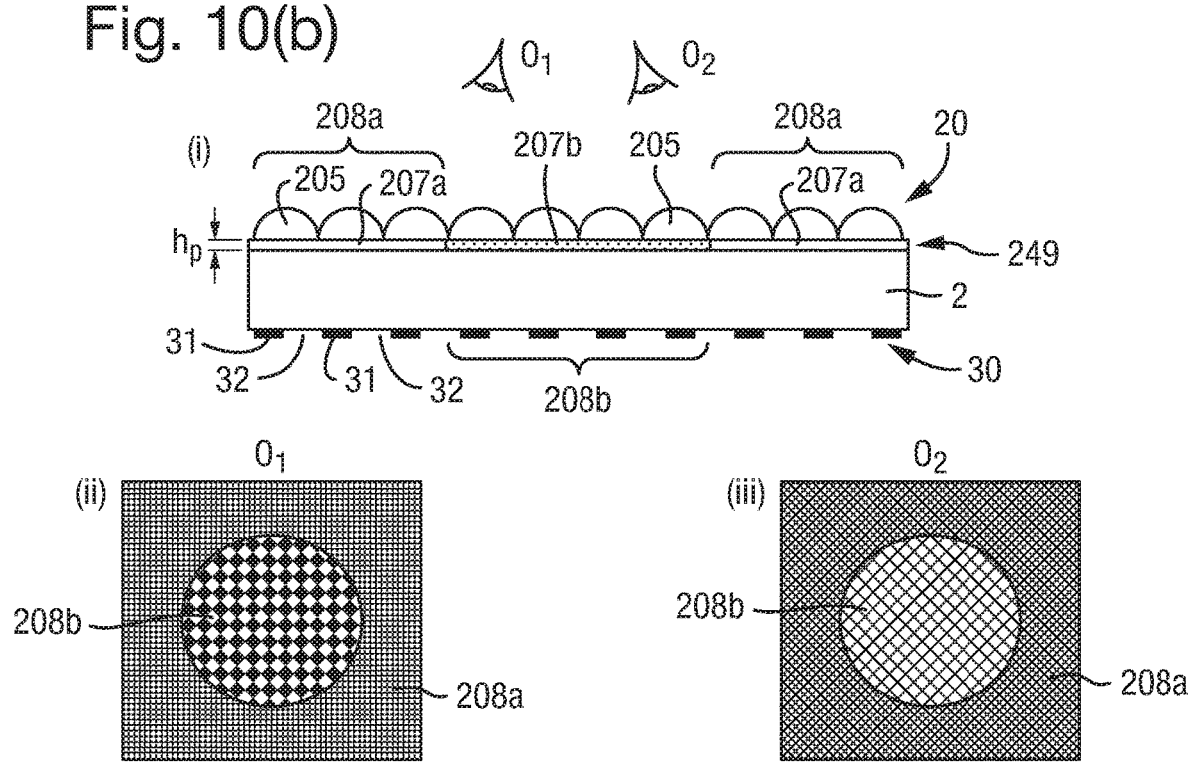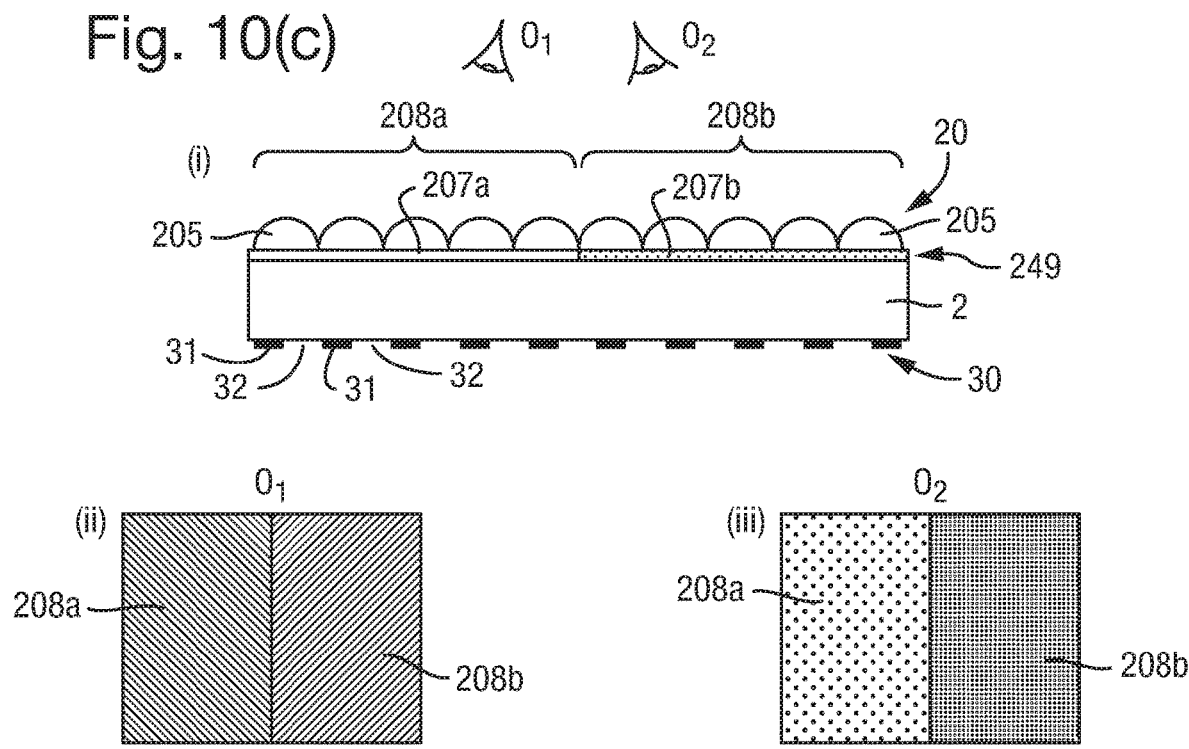

Fig. 10(d)
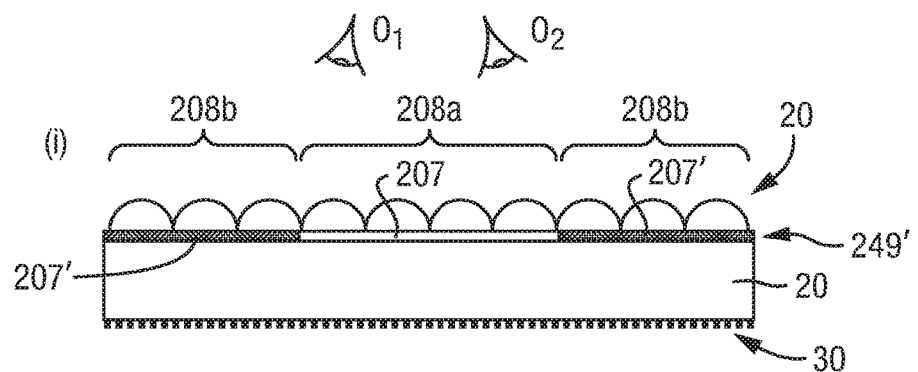
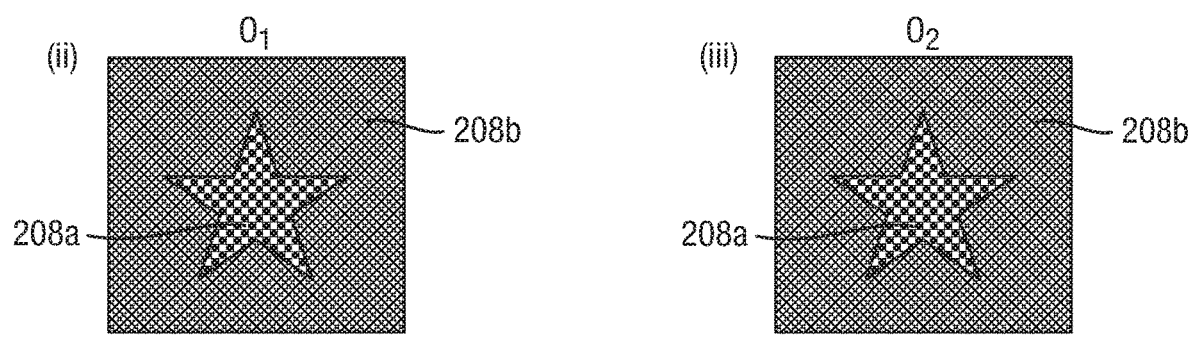
Fig. 11
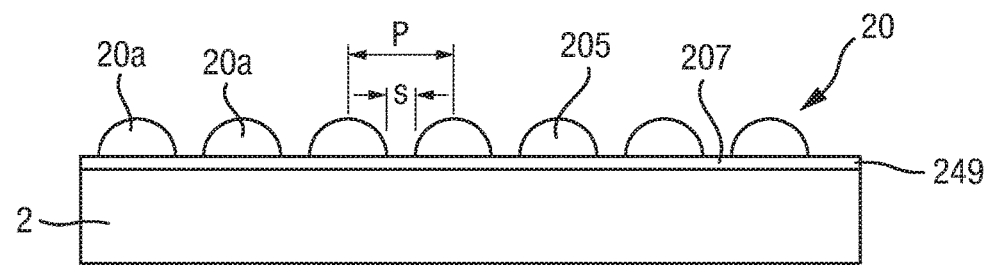

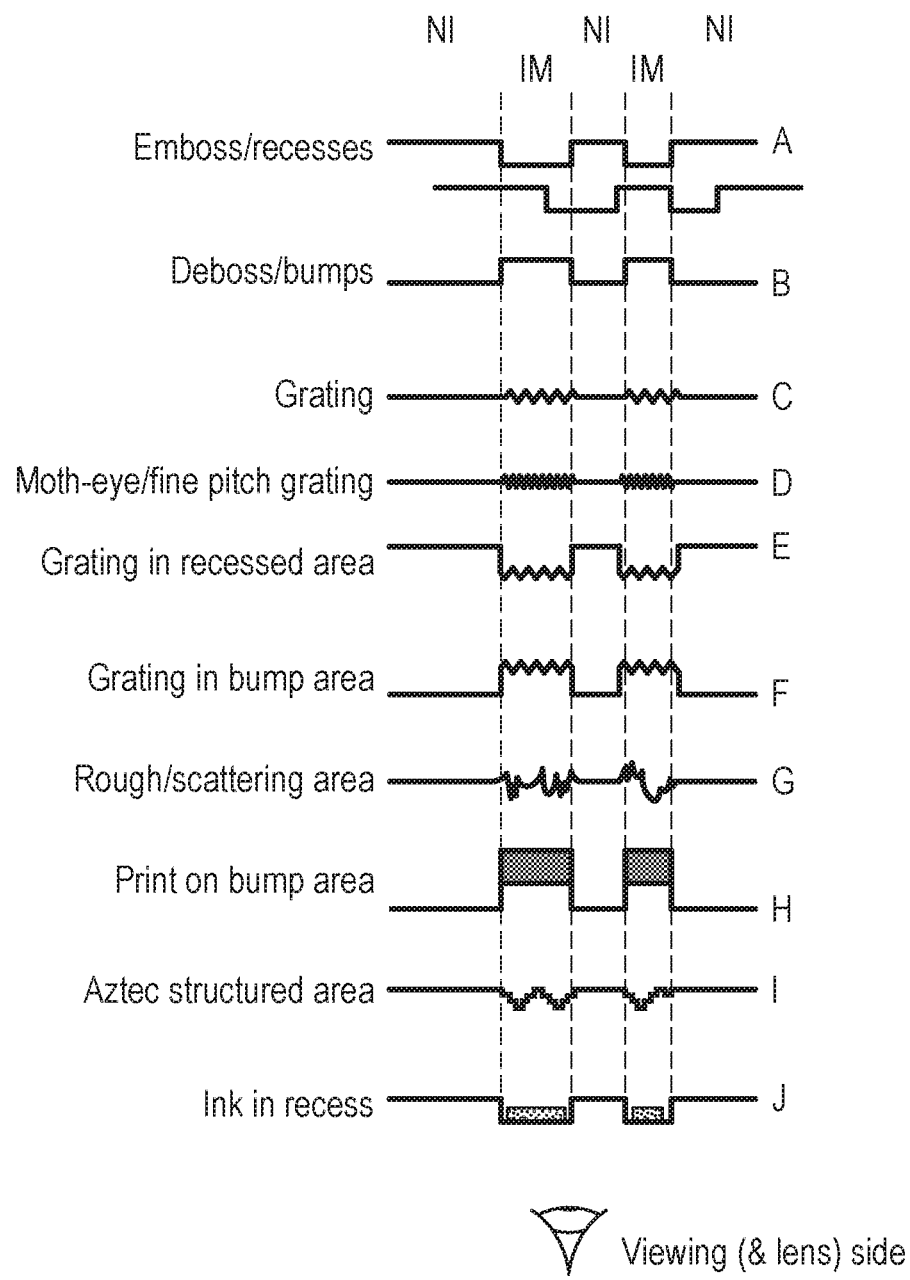

METHODS OF MANUFACTURING SECURITY DOCUMENTS AND SECURITY DEVICES

This invention relates to methods of manufacturing security documents and security devices, and to the corresponding products. Security devices are typically used on security documents such as banknotes, cheques, passports, identity cards, certificates of authenticity, fiscal stamps and other secure documents, in order to confirm their authenticity.

Articles of value, and particularly documents of value such as banknotes, cheques, passports, identification documents, certificates and licenses, are frequently the target of counterfeiters and persons wishing to make fraudulent copies thereof and/or changes to any data contained therein. Typically such objects are provided with a number of visible security devices for checking the authenticity of the object. By "security device" we mean a feature which it is not possible to reproduce accurately by taking a visible light copy, e.g. through the use of standardly available photocopying or scanning equipment. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are those which produce an optically variable effect, meaning that the appearance of the device is different at different angles of view. Such devices are particularly effective since direct copies (e.g. photocopies) will not produce the optically variable effect and hence can be readily distinguished from genuine devices. Optically variable effects can be generated based on various different mechanisms, including holograms and other diffractive devices, moiré interference and other mechanisms relying on parallax such as venetian blind devices, and also devices which make use of focussing elements such as lenses, including moiré magnifier devices, integral imaging devices and so-called lenticular devices.

Security devices comprising focussing elements typically require the use of at least one transparent material either to act as an optical spacer between the focussing elements and an image, or image array, on which the focussing elements are to focus, or to act as a support for the focussing element so that some other object can be viewed therethrough. As such, security devices comprising focussing elements are particularly well suited to deployment on security documents based on polymer document substrates, such as polymer banknotes, since the polymer document substrate can be selected to be transparent and so provide one or both of the above functions if desired. Therefore, in the main part the present disclosure relates to polymer-based security documents.

However, other aspects of the invention disclosed herein are not so limited as will be made clear below. For example, the security devices can be formed using a transparent material which is applied to a security document of any sort, such as a conventional paper-based document, e.g. in the form of a security article such as a thread, strip, patch, foil or inserted which is incorporated into or applied onto the security document.

Several aspects of the invention involve the provision of a focussing element array and an image array located approximately in the focal plane of the focussing element array such that the focussing element array exhibits a substantially focussed image of the image array. This focussed image may preferably be optically variable and could for example be based on any of the mechanisms detailed below. It should be appreciated that in all aspects of the invention the focussing element array and image array could optionally be configured to provide any one or more of these effects, unless otherwise specified:

Moiré magnifier devices (examples of which are described in EP-A-1695121, WO-A-94/27254, WO-A-2011/107782 and WO2011/107783) make use of an array of focusing elements (such as lenses or mirrors) and a corresponding array of microimages, wherein the pitches of the focusing elements and the array of microimages and/or their relative locations are mismatched with the array of focusing elements such that a magnified version of the microimages is generated due to the moiré effect. Each microimage is a complete, miniature version of the image which is ultimately observed, and the array of focusing elements acts to select and magnify a small portion of each underlying microimage, which portions are combined by the human eye such that the whole, magnified image is visualised. This mechanism is sometimes referred to as "synthetic magnification". The magnified array appears to move relative to the device upon tilting and can be configured to appear above or below the surface of the device itself. The degree of magnification depends, inter alia, on the degree of pitch mismatch and/or angular mismatch between the focusing element array and the microimage array.

Integral imaging devices are similar to moiré magnifier devices in that an array of microimages is provided under a corresponding array of lenses, each microimage being a miniature version of the image to be displayed. However here there is no mismatch between the lenses and the microimages. Instead a visual effect is created by arranging for each microimage to be a view of the same object but from a different viewpoint. When the device is tilted, different ones of the images are magnified by the lenses such that the impression of a three-dimensional image is given.

"Hybrid" devices also exist which combine features of moiré magnification devices with those of integral imaging devices. In a "pure" moiré magnification device, the microimages forming the array will generally be identical to one another. Likewise in a "pure" integral imaging device there will be no mismatch between the arrays, as described above. A "hybrid" moiré magnification/integral imaging device utilises an array of microimages which differ slightly from one another, showing different views of an object, as in an integral imaging device. However, as in a moiré magnification device there is a mismatch between the focusing element array and the microimage array, resulting in a synthetically magnified version of the microimage array, due to the moiré effect, the magnified microimages having a three-dimensional appearance. Since the visual effect is a result of the moiré effect, such hybrid devices are considered a subset of moiré magnification devices for the purposes of the present disclosure. In general, therefore, the microimages provided in a moiré magnification device should be substantially identical in the sense that they are either exactly the same as one another (pure moiré magnifiers) or show the same object/scene but from different viewpoints (hybrid devices).

Moiré magnifiers, integral imaging devices and hybrid devices can all be configured to operate in just one dimension (e.g. utilising cylindrical lenses) or in two dimensions (e.g. comprising a 2D array of spherical or aspherical lenses).

Lenticular devices on the other hand do not rely upon magnification, synthetic or otherwise. An array of focusing elements, typically cylindrical lenses, overlies a corresponding array of image sections, or "slices", each of which depicts only a portion of an image which is to be displayed. Image slices from two or more different images are interleaved and, when viewed through the focusing elements, at each viewing angle, only selected image slices will be directed towards the viewer. In this way, different composite images can be viewed at different angles. However it should be appreciated that no magnification typically takes place and the resulting image which is observed will be of substantially the same size as that to which the underlying image slices are formed. Some examples of lenticular devices are described in U.S. Pat. No. 4,892,336, WO-A-2011/051669, WO-A-2011051670, WO-A-2012/027779 and U.S. Pat. No. 6,856,462. More recently, two-dimensional lenticular devices have also been developed and examples of these are disclosed in British patent application numbers 1313362.4 and 1313363.2. Lenticular devices have the advantage that different images can be displayed at different viewing angles, giving rise to the possibility of animation and other striking visual effects which are not possible using the moiré magnifier or integral imaging techniques.

Arrays of lenses or other focussing elements can also be used as a security device on their own (i.e. without a corresponding image array), since they can be used to exhibit a magnified or distorted view of any background they may be placed against, or scene viewed therethrough. This effect cannot be replicated by photocopying or similar.

Aspects of the present invention provide improved methods of manufacturing security documents comprising security devices of the sorts described above.

One aspect of the present invention provides a method of making a security device, comprising:
  (a) forming an array of focussing elements on a first region of a first surface of a focussing element support layer, by:
  (a)(i') applying a pedestal layer comprising at least one transparent material onto at least the first region of the first surface of the focussing element support layer;
  (a)(i) applying at least one transparent curable material either to the pedestal layer or to a casting tool carrying a surface relief corresponding to the focussing elements, over at least the first region;
  (a)(ii) forming the transparent curable material(s) with the casting tool by bringing the first surface of the focussing element support layer against the casting tool such that the at least one transparent curable material is between the surface relief and the pedestal layer, across at least the first region; and
  (a)(iii) curing the transparent curable material(s) on the pedestal layer so as to retain the surface relief in the first region;
  wherein the focal length of the focussing elements is such that their focal plane lies either substantially on the first surface of the focussing element support layer, or beyond the first surface of the focussing element support layer relative to the location of the array of focussing elements.

Thus, the focal length of the focussing elements is at least as long as the distance between the lenses and the focussing element support layer so any image array provided on the first surface of the focussing element support layer or elsewhere is viewed through the pedestal layer during use. By providing a pedestal layer in this way, the deployment of the focussing element array can be improved in various ways without needing to change the process for forming the focussing elements themselves. Thus a standard cast-cure process can be used whilst still achieving additional benefits such as any of the following.

In a particularly preferred embodiment, the at least one transparent material forming the pedestal layer is more flexible than the at least one transparent curable material applied in step (a)(i) once fully cured. This acts as a buffer layer for absorbing deflections as may be experienced by the device during handling, e.g. bending, crumpling or the like. As such, damage to the focussing elements themselves is reduced. Advantageously, the at least one transparent material forming the pedestal layer is elastomeric. Preferably, the at least one transparent material forming the pedestal layer is a curable material and most preferably it has a lower concentration of cross-links than the than the at least one transparent curable material applied in step (a)(i).

In another particularly preferred embodiment, the at least one transparent material forming the pedestal layer comprises at least two transparent materials having different optical detection characteristics, the at least two transparent materials being applied to different respective laterally offset sub-regions of the focussing element support layer in the first region. This can be used to achieve the appearance of a patterned focussing element array thereby increasing the complexity of the security device. Preferably the different optical detection characteristics are any of: different visible colours, different fluorescence, different luminescence or different phosphorescence. Advantageously the first and second sub-regions individually or collectively define one or more indicia, preferably alphanumeric character(s), symbol(s), logo(s), graphics or the like.

In some preferred embodiments, wherein the pedestal layer includes at least one gap in which the transparent material(s) are absent, at least some of the gap(s) preferably extending from one side of the pedestal layer to the other. Advantageously, the at least one gap has a width in the range of 50 to 300 microns, preferably 100 to 200 microns. Gaps such as this can be used to further increase the flexibility and hence longevity of the focussing element array structure. The focussing element array may or may not continue across the gap in the pedestal layer.

Preferably, the pedestal layer has a height of at least 1 micron, preferably at least 2 microns, more preferably at least 5 microns. Thus the pedestal has a non-negligible thickness and contributes noticeably to the optical spacing between the focussing elements and any image array on which they are configured to focus. In particularly preferred embodiments, the pedestal layer has a height in the range 1 to 50 microns, preferably 2 to 30 microns, more preferably between 5 and 30 microns, most preferably between 5 and 25 microns. Nonetheless, the pedestal layer is typically not a self-supporting layer; that is, it does not possess the physical integrity necessary to exist as a standalone structural item but rather requires support from an underlying layer, which here is the focussing element support layer.

In many embodiments, the characteristics of the focussing element array will be uniform across the first region. However, in some preferred implementations, the pedestal layer has a first height in a first sub-region of the first region and a second different height in a second sub-region of the first region. Typically, at least one of the first and second heights, and preferably both, will fall into the preferred height ranges mentioned above. If the pedestal layer comprises more than one material with different optical characteristics, e.g. colours, it may be desirable for the different height sub-regions to coincide with the different material sub-regions, e.g. so that the pedestal layer sub-regions of different height also have a different optical characteristic such as colour.

Typically, in step (a)(i'), the at least one transparent material applied to form the pedestal layer is applied to the first surface of the focussing element support layer as a fluid or gel. For instance, the material(s) may be applied in solution in a suitable solvent which is then dried off, or as a resin which is then hardened, e.g. by curing. Preferably in step (a)(i') the pedestal layer is applied by printing or coating the at least one transparent material onto at least the first region of the first surface of the focussing element support layer, most preferably by gravure printing, lithographic printing, flexographic printing or screen printing.

It is particularly desirable if the at least one transparent material forming the pedestal layer comprises an anti-static substance, preferably an electrically conductive material, most preferably a transparent anti-static substance. In conventional polymer-based security documents, anti-static materials may be included in opacifying layers such as those used as the background for the security prints provided across the major part of the document. It is desirable for such documents to include at least one window or half-window portion in which a security device, such as one including an array of focussing elements, will be deployed. Since the opacifying layer is interrupted in the window region, conventionally no anti-static material is present here and so charge can build up locally, potentially causing the document to adhere to other surfaces, such as other similar documents which can lead to difficulties during document handling. By providing the pedestal layer with anti-static material, such problems are avoided since charge will be dispersed across the device region. It is particularly preferred if the pedestal layer extends to meet any other anti-static layer(s) provided on the document, such as opacifying layers, so that the anti-static properties are provided across substantially the whole document. The anti-static substance may comprise any suitable electrically conductive material, such as graphite particles, which may be dispersed through the at least one transparent material forming the pedestal layer. However, preferably the anti-static substance is itself transparent so as to avoid impacting the visual appearance of the device. Suitable anti-static materials are disclosed in EP1008616, WO2014/000020 and WO2008/042631.

The pedestal layer could have the same perimeter as that of the focussing element array, i.e. it may be provided only in the first region. However, more preferably the pedestal layer extends beyond the first region in at least one direction, preferably in all directions. This reduces the registration requirements placed on the manufacturing process. It is particularly desirable if the size of the pedestal layer is greater than that of the first region in the machine direction of the manufacturing process since it is in this direction that accurate registration between the pedestal application step and the formation of the focussing elements thereon is the most difficult.

The focussing element array could take any configuration necessary for formation of the desired optical effect. However in particularly preferred embodiments, the focussing element array is configured such that each focussing element is spaced from the adjacent focussing elements by a non-zero distance on the pedestal layer, the at least one transparent curable material forming the focussing element array preferably being absent between the focussing elements. This arrangement results in a more robust focussing element assembly since the relatively thin layer of material located between each lens acts as a relatively flexible hinge position about which the array can bend during handling. Particularly good results are achieved if the pedestal layer is formed of a flexible material, e.g. an elastomer, as mentioned above.

Whilst in many cases the whole of the pedestal layer will be transparent, in other embodiments the pedestal layer may preferably further comprise at least one non-transparent material in only a sub-region of the first region, and step (a)(i') further comprises applying the one or more non-transparent materials to the focussing element support layer in the sub-region. In this way, the pedestal layer can be used to define an "active" sub-region of the focussing element array—i.e. that in which the pedestal layer is transparent—whilst inhibiting the optical effect in the sub-region where the pedestal layer is non-transparent. The non-transparent material may be translucent, i.e. non-opaque but optically scattering, or could be opaque.

Preferably, the method further comprises: (b) providing an image array located in a plane spaced from the array of focussing elements by a distance substantially equal to the focal length of the focussing elements whereby the focussing elements exhibit a substantially focussed image of the image array. The image array can be configured to cooperate with the focussing element array to produce an optically variable effect, e.g. of any of the types mentioned above The invention further provides a security device, comprising an array of focussing elements formed of at least one curable transparent material disposed across a first region of a focussing element support layer on a first surface thereof, and further comprising a pedestal layer comprising at least one transparent material between the at least one curable transparent material forming the array of focussing elements and the first surface of the focussing element support layer, wherein the focal length of the focussing elements is such that their focal plane lies either substantially on the first surface of the focussing element support layer, or beyond the first surface of the focussing element support layer relative to the location of the array of focussing elements. The pedestal layer and the focussing element array can each be implemented with any of the preferred features mentioned above.

This aspect of the invention further provides a security document, comprising a polymer substrate having first and second surfaces;

an array of focussing elements formed of at least one curable transparent material disposed across a first region of a focussing element support layer, and further comprising a pedestal layer comprising at least one transparent material between the at least one curable transparent material forming the array of focussing elements and the focussing element support layer, wherein the focal length of the focussing elements is at least as long as the distance between the lenses and the focussing element support layer, wherein the focussing element support layer is either the polymer substrate or another layer applied thereto; and at least one opacifying layer applied to the first and/or second surface of the polymer substrate, the or each opacifying layer comprising a non-transparent material, wherein at least the opacifying layer(s) on the first surface of the substrate define a gap forming a window region in which at least part of the array of focussing elements is disposed.

Again, the pedestal layer and the focussing element array can each be implemented with any of the preferred features mentioned above.

The window region could be a full window (in which the opacifying layers are absent on both surfaces of the polymer substrate) or a half window (in which the opacifying layers are present on one surface and absent on the other) or some combination of the two. This definition applies wherever the term window region is used throughout this disclosure unless indicated otherwise.

The security document may preferably be a banknote, cheque, identification document, passport, visa or stamp.

Preferably the image array if proved is located on the second surface of the polymer substrate. However, in other cases the image array or a second image array could be provided on the first surface of the polymer substrate, e.g. if the focussing element array is formed in an additional transparent layer applied to the first surface of the polymer substrate and itself provides the necessary optical spacing. Such an additional transparent layer could be provided by laminating a component carrying the focussing element array onto the first surface, or by cast curing for instance.

Preferably, the image array can be configured to co-operate with the focussing element array to produce an optically variable effect, e.g. of any of the types mentioned above. For example, in a particularly preferred embodiment, the image array comprises a microimage array, and the pitches of the focusing element array and of the microimage array and their relative orientations are such that the focusing element array co-operates with the microimage array to generate a magnified version of the microimage array due to the moiré effect. (Moiré magnifier)

In another case, the image array comprises a microimage array, the microimages all depicting the same object from a different viewpoint, and the pitches and orientation of the focusing element array and of the microimage array are the same, such that the focusing element array co-operates with the microimage array to generate a magnified, optically-variable version of the object. (Integral imaging device)

In a still further example, the image array comprises a set of first image elements comprising portions of a first image, interleaved with a set of second image elements comprising portions of a second image, the focusing element array being configured such that each focusing element can direct light from a respective one of the first image elements or from a respective one of the second image elements therebetween in dependence on the viewing angle, whereby depending on the viewing angle the array of focusing elements directs light from either the set of first image elements or from the second image elements therebetween, such that as the device is tilted, the first image is displayed to the viewer at a first range of viewing angles and the second image is displayed to the viewer at a second, different range of viewing angles. (Lenticular device)

The security documents and security devices of the current invention can be optionally be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials. This applies to all aspects of the invention.

Examples of security documents, security devices and methods of manufacture thereof will now be described with reference to the accompanying drawings, in which.

Figure 4A:
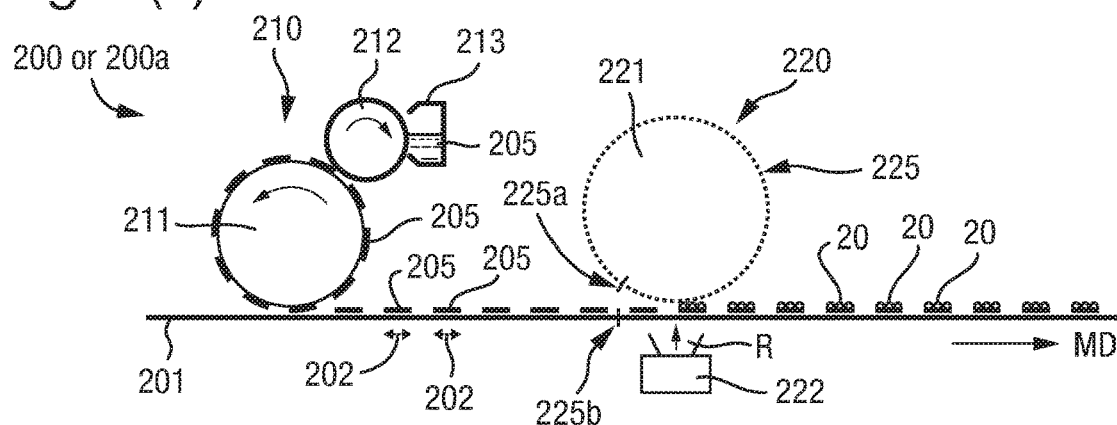
Figure 4B:
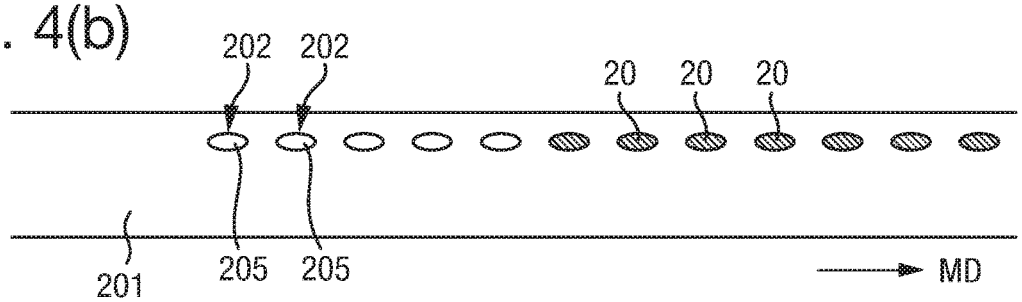
Figure 5A:
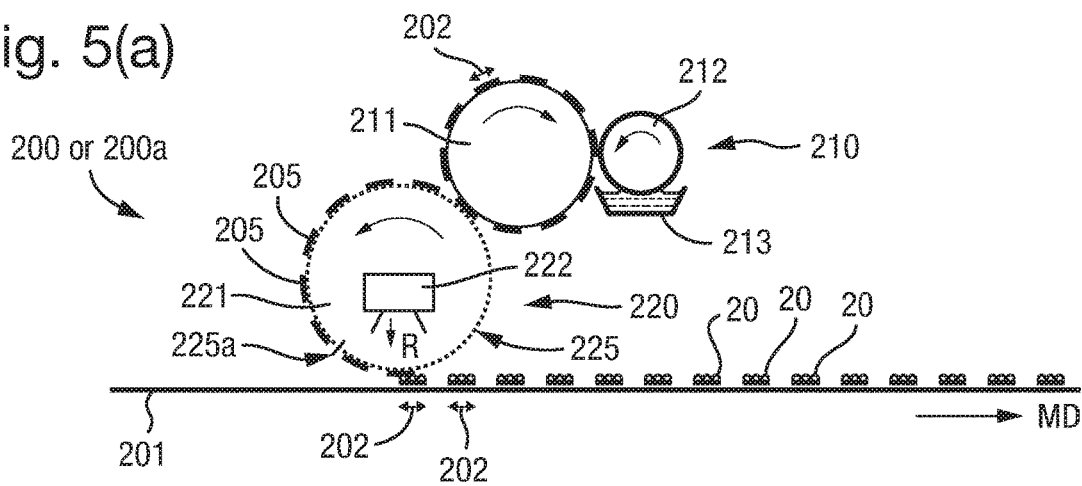
Figure 5B:
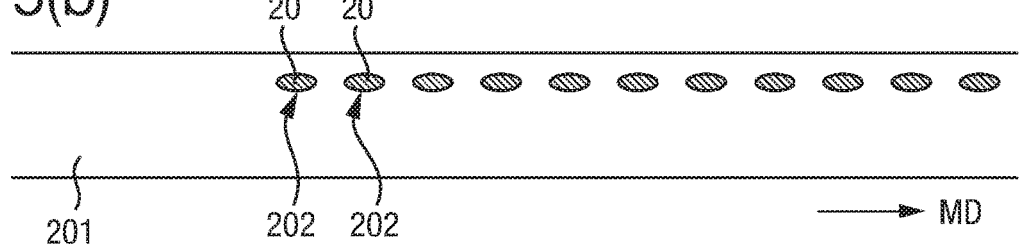

FIG. 3 schematically depicts exemplary apparatus for manufacturing a security document in an embodiment;

FIGS. 4, 5, 6 and 7 show comparative examples of apparatus for forming a focussing element array, in each case illustrating (a) the apparatus from a side view, and (b) a perspective view of the focussing element support layer, FIG. 5(*c*) showing a further variant of FIG. 5(*a*);

FIG. 8(*a*) shows an embodiment of apparatus for forming a focussing element array in accordance with the present invention, illustrating the apparatus from a side view, and FIG. 8(*b*) shows a portion of an exemplary security document formed using the method of FIG. 8(*a*), in cross-section;

FIG. 9 shows a further embodiment of apparatus for forming a focussing element array;

FIG. 10(*a*) shows a portion of an exemplary security document formed using the method of FIG. 9, in cross-section, FIGS. 10(*b*) to (*d*) showing three further embodiments of security devices (i) in cross-section, (ii) in plan view from a first viewing angle and (iii) in plan view from a second viewing angle;

FIG. 11 depicts a further embodiment of a security device, in cross-section;

FIGS. 12(*a*) to (*c*) depict three further embodiments of security devices, in cross-section; and FIG. 13A to J shows examples of elements of image arrays formed as relief structures.

The ensuing description will focus on preferred techniques for the manufacture of security documents, such as bank notes, based on polymer document substrates. However, many aspects of the disclosure are more widely applicable and so should not be considered limited to use on polymer-based security documents unless otherwise indicated or necessitated by the nature of the product or method in question. For example, many of the methods and products described below can be utilised on security documents of conventional construction, e.g. paper-based documents. For instance, the described methods can be performed on a polymeric support layer which can then be affixed to or incorporated into a security document of any type. However, in all cases the preference is for combination with a polymer-based security document.

To aid understanding, the following terminology has been used throughout the present disclosure:

Polymer substrate—this refers to a polymer document substrate which ultimately forms the main body of a security document. Examples of such polymer substrates are discussed below.

Focussing element array—this refers to an array of elements capable of focussing visible light, such as lenses or mirrors. The term "array of focussing elements" is analogous. Examples are given below.

Image array—this refers to a graphic which typically comprises a pattern of microimages or image elements, although neither is essential. In preferred cases the image array co-operates with a focussing element array to generate an optically variable effect. For example, the image array and the focussing element array may in combination form a moiré magnifier, an integral imaging device or a lenticular device (each described above), or some other optically variable device. In many preferred examples, the image array is formed of elements of applied ink or another such material. However this is not essential since the image array could instead be formed of recesses or the like. Preferred methods of manufacturing image arrays are discussed below.

Focussing element support layer—this is a layer on the surface of which the focussing elements are formed. The focussing element support layer could be the polymer substrate (defined above) or could be another layer which is then applied to a document substrate (paper or polymer), or used as a carrier from which the focussing elements are later transferred to a document substrate (paper or polymer). For instance the focussing element support layer could take the form of a security article such as a thread, strip, patch or foil which is then incorporated into or onto a security document.

Pattern support layer—this is a layer on the surface of which the image array (e.g. a pattern) is formed. The pattern support layer could be the polymer substrate (defined above) or could be another layer which is then applied to a document substrate (paper or polymer), or used as a carrier from which the image array is later transferred to a document substrate (paper or polymer). For instance the pattern support layer could take the form of a security article such as a thread, strip, patch or foil which is then incorporated into or onto a security document.

Transparent material—"transparent" is used to mean that the material is substantially visually clear, such that an item on one side of the material can be seen sharply through the material from the other side. Therefore transparent materials should have low optical scatter. However, transparent materials may nonetheless be optically detectable (defined below), e.g. carrying a coloured tint.

Optically detectable material/optical detection characteristics—an optically detectable material may or may not be transparent but is detectable either to the human eye or to a machine via an optical detector (e.g. a camera), or both. Thus, the optical detection characteristic(s) of the material could be for example a visible colour, a non-visible reflection or absorbance such as UV or IR reflection or absorbance, or a photoluminescent response such as fluorescence or phosphorescence (the stimulating radiation and/or the emitted radiation being visible or invisible), or the like.

Curable material—"curable" means that the material hardens (i.e. becomes more viscous and preferably solid) in response to exposure to curing energy which may for example comprise heat, radiation (e.g. UV) or an electron beam. The hardening involves a chemical reaction such as cross-linking rather than mere physical solidification, e.g. as is experienced by most materials upon cooling.

For reference throughout the description of preferred manufacturing processes below, FIG. 1 shows an exemplary security document 1, such as a banknote, based on a polymer substrate construction. FIG. 1(a) shows the document in plan view and FIGS. 1(b), (c) and (d) show three alternative cross-sections along the line X-X'. It will be appreciated that the constructions shown are merely exemplary and alternative arrangements are viable, some of which will be discussed with reference to particular preferred manufacturing techniques discussed below.

The security document 1 is based on a polymer substrate 2 which is preferably transparent but this is not essential in all embodiments. The polymer substrate 2 has a first surface 2a and a second surface 2b. It should be noted that wherever components are described herein as being "on" one of the surfaces of the polymer substrate 2, or actions are described as being performed "on" one of said surfaces, this does not require the component or action to be directly on the surface of the polymer substrate. Rather, some intermediate layer, such as a primer layer, could exist immediately on the surface of the polymer substrate itself and the component or action may be applied to or performed on that intermediate layer, unless otherwise specified.

Figure 1A:
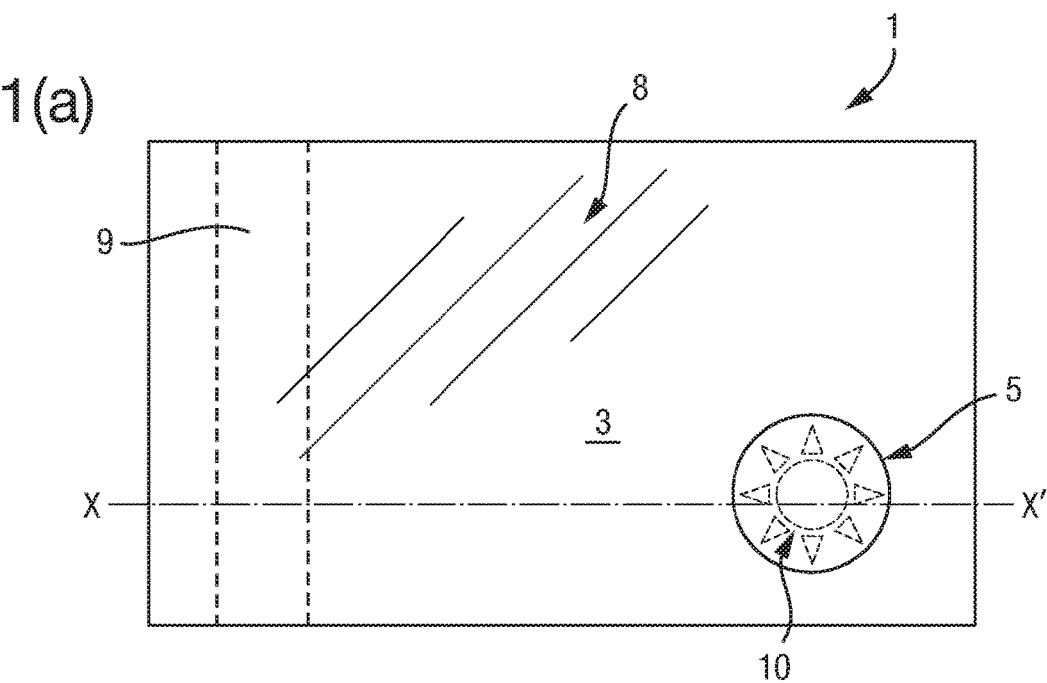
FIG. 1(*a*) shows an exemplary security document in plan view, FIGS. 1(*b*), (*c*) and (*d*) showing three alternative cross-sections along the line X-X'.

On at least one of the surfaces of the polymer substrate 2, preferably both, one or more opacifying layers 3a, 3b (indicated generally as 3 in FIG. 1(a)) are provided. The opacifying layers typically cover a large proportion of the surface area of the security document 1, in some cases the entire area (as in FIG. 1(c), described below), but in other cases being omitted on one or both sides of the polymer substrate 2 in localised areas to form window regions. An exemplary window region 5 is shown in FIGS. 1(a), (b) and (c) but is omitted in the FIG. 1(d) variant. The opacifying layer(s) 3 are configured to provide a suitable background for a graphics layer 8, typically applied by printing, which in the case of a banknote generally comprises secure fine line patterns such as guilloches, a portrait, currency and denomination information and the like. Thus the opacifying layers 3 are non-transparent and, in the case of a transparent polymer substrate 2, act to increase the opacity of the document 1 as a whole.

Figure 1B:
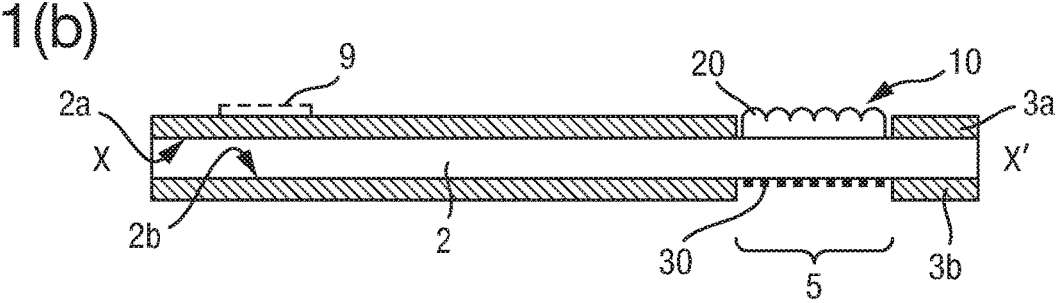
Figure 1C:
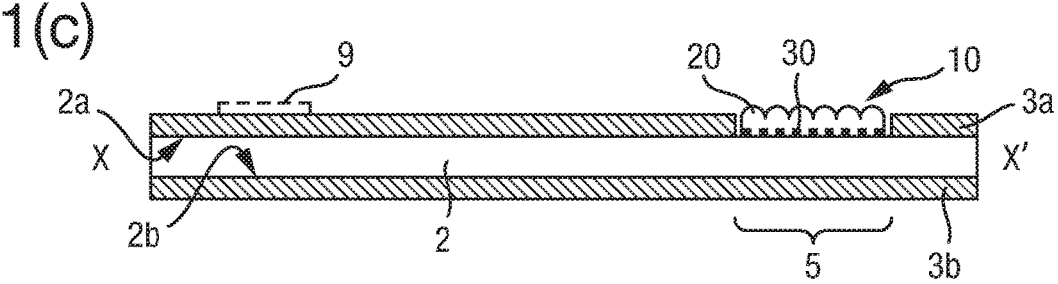

If the opacifying layers 3 are omitted in the window region 5 on both sides of the polymer substrate 2, as shown in FIG. 1(b), the window region will be a "full window" and, provided the polymer substrate is transparent, will itself be transparent. If the opacifying layers are omitted in the window region 5 on one side of the polymer substrate 2 but not the other, the window region will be a "half window" which is non-transparent but typically of lower opacity than the surrounding regions of the document 1. An example of a half window is shown in FIG. 1(c) in which the first opacifying layer(s) 3a on the first surface 2a of the polymer substrate 2 are absent in the window region 5 but the second opacifying layer(s) 3b on the second surface 2b are continuous across the window region 5. It will be appreciated that the window region 5 could contain a mixture of full and half window areas by arranging the gaps in the first and second opacifying layers to overlap one another only partially (not shown). In FIG. 1(c) there is no window, both opacifying layers 3a and 3b being continuous across region 5.

Figure 1D:
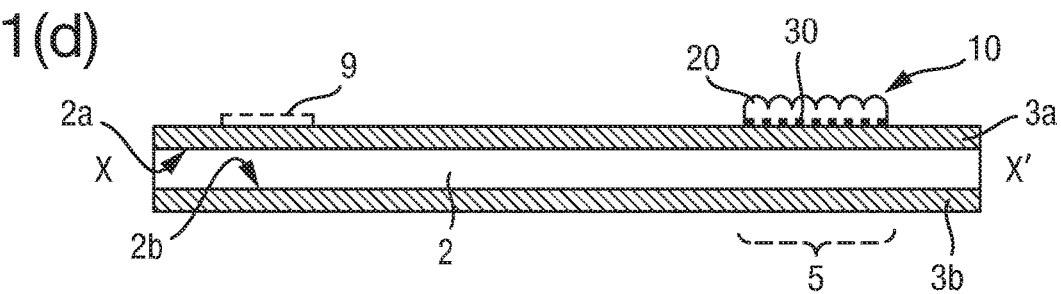

The security document 1 is provided with a security device 10 which comprises at least an array of focussing elements 20 provided on the first surface of the polymer substrate 2. The security device 10 could consist exclusively of the focussing element array 20 or may also comprise an image array 30 as discussed below. In the constructions of FIGS. 1(b) and 1(c), the focussing element array is applied in a gap defined by the first opacifying layer 3a such that the security device 10 is located in a window region 5 as discussed above. However this is not essential and FIG. 1(d) shows an example where the focussing element array 20 is applied to the first surface 2a of the polymer substrate 2 over the first opacifying layer(s) 3a. Preferred methods for manufacturing the focussing element array 20 are discussed below, as well as preferred configurations of the focussing element array 20 itself.

The image array 30, if provided, is preferably located in a plane which substantially corresponds to the focal plane of the focussing elements array 20 (e.g. to within +/−10%, more preferably +/−5%) so that the focussing element array 20 exhibits a substantially focussed image of the image array 30, which is illustrated schematically by the broken-line sun-shaped outline in FIG. 1(*a*). In practice this focussed image may be optically variable, i.e. have different appearances at different viewing angles, and as such may be referred to more generally as the "optical effect" exhibited by the security device 10. For instance, the image array 30 could co-operate with the focussing element array 20 to form a moiré magnification device, an integral imaging device or a lenticular device, the principles of each having been discussed above, or any combination thereof. Preferred methods of manufacturing the image array 30, as well as examples of its configuration, are discussed below.

The focussing element array 20 and image array 30 can be provided at various different positions provided the necessary spacing between them is achieved. In the FIG. 1(*b*) example, this spacing is provided at least in part by the polymer substrate 2 itself, which here is transparent. The focussing element array 20 is located on the first surface 2*a* of the polymer substrate 2 whilst the image array 30 is located on the second surface 2*b*. It will be appreciated that whilst FIG. 1(*b*) shows the device 10 as being located in a full window, the second opacifying layer(s) 3*b* could continue across all or part of the window region 5 (over the image array 30), forming a half window or a mixture of full and half window portions.

In the FIG. 1(*c*) example, both the focussing element array 20 and the image array 30 are provided on the first surface 2*a* of the polymer substrate 2, which now need not be transparent (although this is still preferred). The optical spacing is provided by means other than the polymer substrate 2. In this case the focussing element array 20 and image array 30 are located in a gap in the first opacifying layer(s) 3*a* which forms a half-window. However, the second opacifying layer(s) 3*b* could also be at least partially omitted across the window region 5 to form a full window or a mixture of full and half window portions.

In the FIG. 1(*d*) example, the focussing element array 20 and image array 30 are again both provided on the first surface 2*a* of the polymer substrate 2, this time over the first opacifying layer 3*a* since as previously indicated no window is formed in this case. Again the optical spacing is achieved by means other than use of the polymer substrate 2. It will be appreciated from the FIG. 1(*d*) example, in which the polymer substrate need not be transparent, that whilst security devices 10 of the sort disclosed herein are particularly well suited to application to documents based on polymer substrates, they are not limited in this regard and can be utilised on any type of security document, e.g. those based on paper substrates, or indeed on any article which requires protection from counterfeiting.

Depending on the type of optical effect desired to be displayed by the security device 10, accurate registration between the focussing element array 20 and the image array 30 may or may not be necessary. However this is highly desirable in certain cases.

The security documents and security devices disclosed herein can be optionally be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials. This applies to all embodiments of the invention.

Typically to form the finished security document 1, a number of additional processes will take place, including printing of the graphics layer 8 already mentioned above, as well as application of any further security articles such as security threads, strips, patches, foils or the like which may carry features such as diffractive elements (e.g. holograms or Kinegrams), iridescent material, colour-shifting material etc. One example of such an applied security article is shown in FIG. 1 as strip 9. The so-formed material (generally in the form of a web or a sheet, at this stage, as discussed further below) will then be cut into individual security documents 1. All of these process steps are considered optional in the present disclosure and can be implemented by conventional means.

Figure 2:
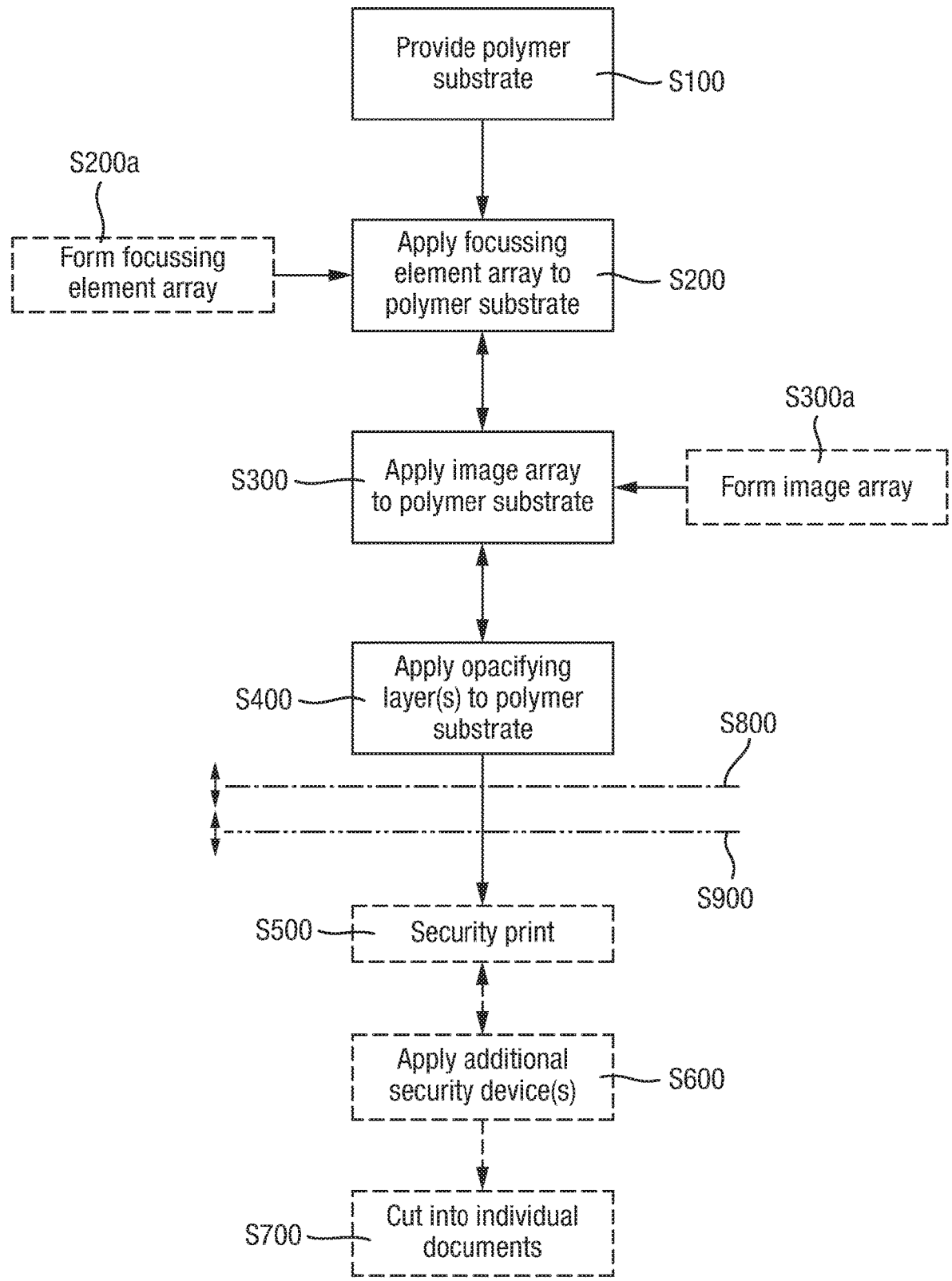
FIG. 2 is a flow diagram illustrating selected steps of a method of manufacturing a security document according to one embodiment.

Turning now to the manufacturing process, FIG. 2 is a flow diagram illustrating, at a high level, the main process steps in an exemplary implementation. It must be emphasised that the order of the steps can be varied significantly. Therefore, FIG. 2 serves merely to introduce the key steps involved in manufacturing a polymer-based security document and should not be considered to limit the order of those steps, except where otherwise indicated. It should further be noted that all steps shown in dashed lines are optional.

Thus in step S101, a polymer substrate 2 is provided, typically in web form.

In step S200, a focussing element array 20 is applied to the polymer substrate on its first surface. This will be described below but for the time being it is sufficient to note that the step S200 could involve actual formation of the focussing element array, either on the polymer substrate or on an intermediate component such as a security thread, strip or patch (indicated as step S200*a*) which is then affixed to the polymer substrate. However this is not essential since the focussing element array could be formed in some separate process, possibly by a different entity, as an article such as a security thread, strip or patch, in which case the present step S200 need only involve affixing the pre-formed focussing element array 20 to the polymer substrate 2. For this reason, in the main part the discussion below describes preferred methods of forming the focussing element array as taking place on a focussing element support layer, which could be the polymer substrate 2 but alternatively could be a carrier layer in such a component.

In step S300, an image array 30 is applied to the polymer substrate as will be described below. However, as in the case of the focussing element array 20, similarly step S300 may or may not involve the actual formation of the image array 30. That is, step S300 may comprise forming the image array 30 either on a surface of the polymer substrate or on an intermediate component such as a security thread, strip or patch (indicated as step S300*a*) which is then affixed to the polymer substrate. Alternatively the image array could be formed in some separate process, possibly by a different entity, as an article such as a security thread, strip or patch, in which case the present step S300 need only involve affixing the pre-formed image array 30 to the polymer substrate 2. For this reason, in the main part we describe preferred methods of forming the image array as taking place on a pattern support layer, which could be the polymer substrate 2 but alternatively could be a carrier layer in such a component.

Indeed, where the focussing element array 20 and the image array 30 are both formed away from the polymer substrate 2 and then applied thereto, the focussing element array 20 and the image array 30 could each be formed as part of one and the same security article (such as a thread, strip or patch) which can then be affixed to the polymer substrate 2 in a single step. Thus the focussing element support layer and the pattern support layer could be provided by a single support layer. It is noted as an aside that security articles equipped with a focussing element array 20 and an image array 30 can be applied to any type of security document, not necessarily one based on a polymer substrate.

In step S400, the at least one opacifying layer(s) are applied to the first and/or second surfaces of the polymer substrate 2. In practice this may optionally take place in several steps, which need not all be performed immediately sequentially, one after the other. For instance, one or more of the opacifying layers could be applied before steps S200 and/or S300.

In step S500, which is optional, the graphics layer 8 is applied to the opacifying layers, typically by way of security printing techniques. For example, the graphics layer 8 may be printed by any conventional printing technique, or combination of techniques, such as intaglio printing, lithographic printing, offset printing, flexographic printing, gravure printing and the like. The graphics layer 8 typically comprises high resolution patterns such as fine line patterns and guilloches, portraits, and other indicia. In step S600, which is also optional, any additional security devices on articles such as threads, strips, patches etc., are applied to the substrate. Any conventional techniques for applying such components can be utilised, including bonding by adhesives, lamination, hot stamping, transfer methods and the like. The security devices could be of any known type, such as holograms, kinegrams and other diffractive elements, iridescent or colour-shift material, etc. Steps S500 and S600 could take place in either order and/or as a series of sub-steps which could be intermingled with one another. Finally, the processed material is cut into individual security documents in step S700.

In the present example, all of the steps described have been web-based processes, i.e. applied to a web of the polymer substrate 2, e.g. in one in-line process. Typically a web with a large width (e.g. between 0.75 and 1.5 m) is supplied for this purpose. However, for some process steps it is desirable to reduce the width of the web, e.g. so that shorter (and hence less costly) processing tools can be used. It is also desirable to carry out certain process steps on individual sheets of the material, rather than on a continuous web. This is particularly the case for security print step S500. Hence, line S800 represents slitting the initial web along its longitudinal direction so as to reduce its width, subsequent processing steps utilising processing tools of correspondingly shorter width compared with those of the preceding steps. Line S900 represents dividing the web into sheets, by cutting it along its cross direction at intervals spaced in the longitudinal direction. This process is sometimes referred to as "sheeting". Each sheet will preferably be sized so as carry a plurality of the final security documents. Subsequent processes are performed using sheet-fed machinery.

It will be appreciated that the points in the process at which steps S800 and S900 are performed can be varied and are indicated only schematically in FIG. 2. Typically at least one process step will be performed on the reduced-width web (i.e. between steps S800 and S900), although this is not depicted here.

To illustrate the production of various key components of the security document 1 by the above steps, FIG. 3 schematically illustrates exemplary apparatus for carrying out steps S200, S300 and S400 on a polymer substrate 2 in the form of a web. It will be noted that the order of steps shown here is different from that in FIG. 2. The polymer substrate 2 is provided from a supply such as a reel 100. The polymer substrate may undergo various treatment steps (not shown in FIG. 3), such as the application of a primer or corona treatment, before being subjected to the processing described below. The polymer substrate is conveyed along a transport path by a transport module (not shown) of conventional construction. The direction of transit is termed the machine direction (MD) and the orthogonal direction in the plane of the web is the cross direction (CD).

At a focussing element station 200, a focussing element array 20 is applied to the first surface of the substrate. As mentioned above, this may involve actual forming of the focussing element array 20 in-situ on the polymer substrate, e.g. by cast-curing, or could involve supplying a security article 290, shown in the form of a thread or strip, from an ancillary supply 200a and affixing at least portions of it carrying a pre-formed focussing element array to the surface of the polymer substrate, e.g. by lamination, adhesive or hot-stamping. Further details of preferred methods for forming the focussing element array 20 are below. In the example shown, the focussing element array 20 is applied at spaced intervals so as to form one or more devices 10 on each section of the web that will form a separate security document once cut. However in other cases the focussing element array could be applied continuously along the polymer substrate 2.

At an opacifying layer station 400, one or more opacifying layer(s) are applied to the first and/or second surfaces of the polymer substrate 2, as described further below. Since the focussing element array 20 has already been applied to the polymer substrate in this embodiment, the application of the first opacifying layer 3a should omit at least part of the area(s) in which the focussing element array 20 is disposed so that it remains at least partially uncovered. The exception is where the focussing element array comprises mirrors rather than lenses in which case it could be covered on the first surface of the substrate and ultimately viewed from the opposite side. In the example shown, the second opacifying layer 3b is also omitted in the same area, so as to form a full window in which the focussing element array 20 is arranged.

At an image array station 300, an image array 30 is applied to the second surface of the polymer substrate 2. As mentioned above, this may involve actual forming of the image array 30 in-situ on the polymer substrate, e.g. by printing, or could involve supplying a security article 390, shown in the form of a thread or strip, from an ancillary supply 300a and affixing at least portions of it carrying a pre-formed image array to the surface of the polymer substrate, e.g. by lamination, adhesive or hot-stamping. Further details of preferred methods for forming the image array 30 are below. In the example shown, the image array 30 is applied opposite each of the focussing element arrays 20 such that in each window the device 10 exhibits a focussed image of the image array 30.

The web can then go on to be subjected to any of the optional processing steps described previously with respect to FIG. 2, not shown in FIG. 3. As noted above, whilst the apparatus shown in FIG. 3 is depicted as an in-line, web-based process, it is not essential that all of steps S200, S300 and S400 be carried out in such a way.

A focussing element array 20 comprises a plurality of focussing elements, typically lenses or mirrors, arranged over an area typically in a regular one-dimensional or two-dimensional grid. The nature of the focussing elements will depend on the desired optical effect but examples include cylindrical focussing elements, spherical focussing elements, aspherical focussing elements, elliptical focussing elements, Fresnel focussing elements and the like. The focussing elements can operate on refraction, diffraction or reflection (in the case of mirrors). For brevity, in the discussion below the term "lens" is used interchangeably with the term "focussing element" but this should not be taken as limiting.

The focal length of the lenses is directly related to their size (radius) and the available optical spacing must be taken into account when designing the lens array. Generally, the relationship between focal length f and lens radius r is:

$$f \propto \frac{r}{\Delta n}$$

where $\Delta n$ is the difference in refractive index across the interface defining the lens surface. In an example, for an image array 30 on the second surface of the polymer substrate 2 to be focussed by a focussing element array on the first surface of the polymer substrate 2, the optical geometry must be taken into account when selecting the thickness of the polymer substrate 2 (and any other optical spacer layer that may exist between the focussing element array 20 and the image array 30) and the dimensions of the lenses. In preferred examples the thickness is in the range 50 to 100 microns, hence the focussing element array should have a focal length in the same range. The periodicity and therefore maximum base diameter (or width, in the case of elongate lenses) of the focusing elements is preferably in the range 5 to 200 μm, more preferably 10 to 100 μm and even more preferably 10 to 70 μm. In other examples, the focussing element array 20 and image array 30 may both be arranged on the same side of the polymer substrate in which case the available optical spacing is likely to be smaller (e.g. 5 to 50 microns) and hence the dimensions of the lenses will need to be correspondingly reduced. The f number for the lenticular focusing elements is preferably in the range 0.1 to 16 and more preferably 0.5 to 4.

The focussing element array 20 could include focussing elements with different optical properties from one another, e.g. different focal length, in different sub-regions of the array, by appropriate design of the elements' shape and size. For example, the focussing element array could include lenses of different height from one another giving rise to different focal lengths in each region. In such cases, if a focussed image of an image array 30 is desired the image array 30 may be located at just one of the focal lengths, or two image arrays 30 could be provided, one at each focal length.

The focussing element array 20 can be formed either on the first surface of the polymer substrate 2 or could be on another (transparent) support layer which is then affixed to the first surface of the polymer substrate 2. As defined above, the term "focussing element support layer" is intended to cover both of these options and is therefore used below. In places this is shorted to "support layer" for brevity.

In embodiments of the present invention, the focussing element array 20 is formed by cast-curing. This involves applying a transparent curable material either to the support layer or to a casting tool carrying a surface relief defining the desired focussing element array, forming the material using the casting tool and curing the material to fix the relief structure into the surface of the material.

Figure 5C:
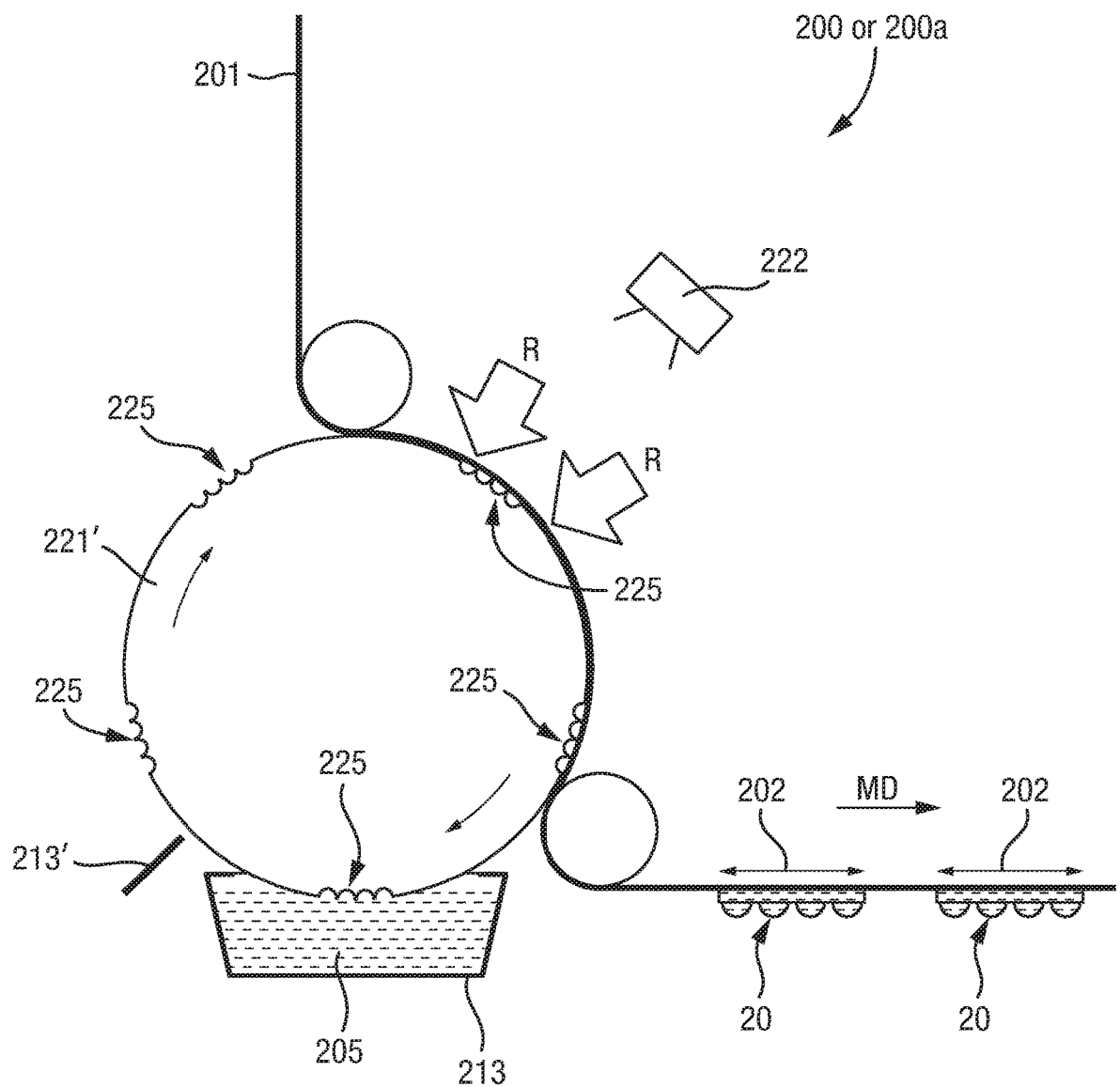

For reference, FIGS. 4 and 5 schematically depict two cast-curing techniques which constitute comparative examples. Components common to both methods are labelled with the same reference numbers. In both cases the process is shown as applied to a focussing element support layer 201, comprising a transparent film, which may be the aforementioned polymer substrate 2 or could be another layer which is later applied to the polymer substrate 2. In each case, Figure (a) depicts the apparatus from a side view, and Figure (b) shows the support layer in a perspective view, the manufacturing apparatus itself being removed for clarity. FIG. 5(c) shows a variant of the FIG. 5(a) example.

Figure 6A:
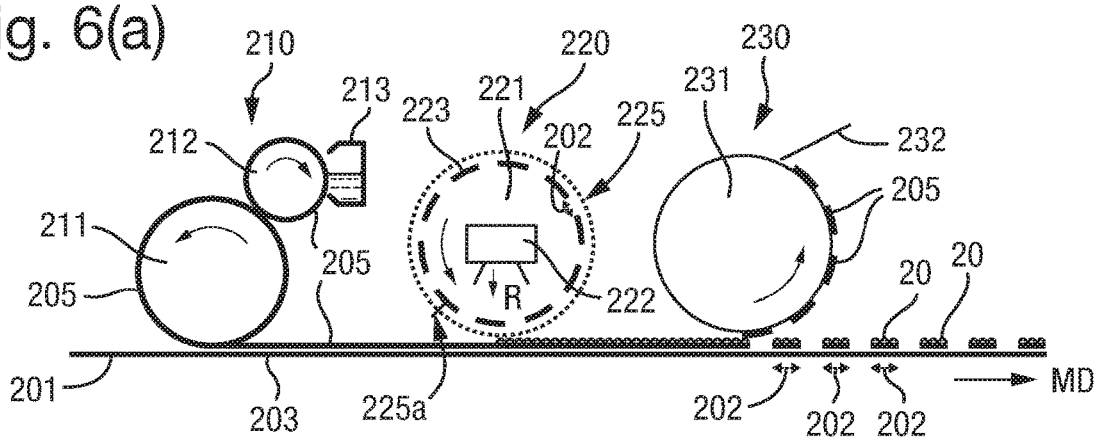
Figure 6B:
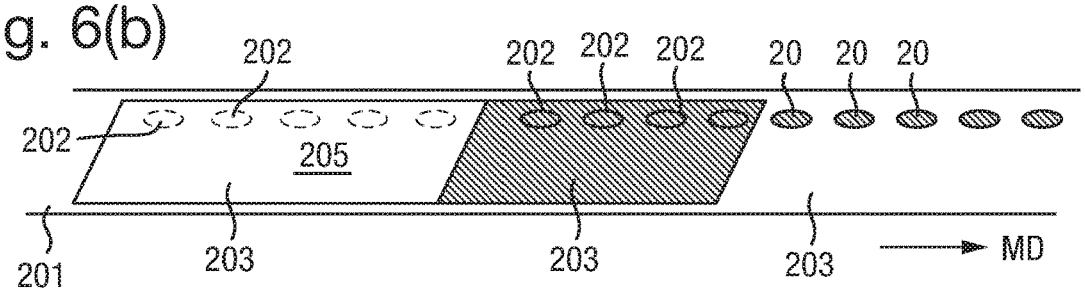
Figure 7A:
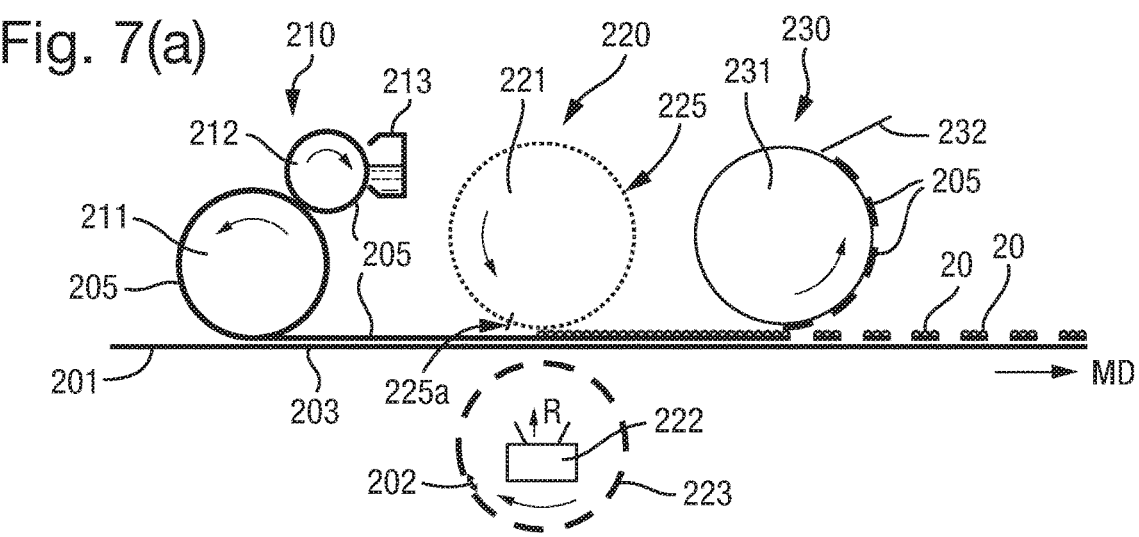
Figure 7B:
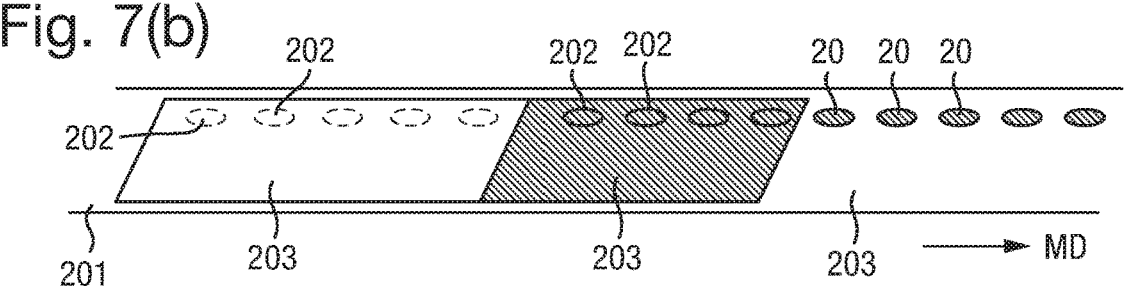

In the FIG. 4 example, a transparent curable material 205 is first applied to the support layer 201 using an application module 210 which here comprises a patterned print cylinder 211 which is supplied with the curable material from a doctor chamber 213 via an intermediate roller 212. For example, the components shown could form part of a gravure printing system. Other printing techniques such as lithographic, flexographic, screen printing or offset printing could also be used. Print processes such as these are preferred since the curable material 205 can then be laid down on the support 201 only in first regions 202 thereof, the size, shape and location of which can be selected by control of the print process, e.g. through appropriate configuration of the pattern on cylinder 211. However, in other cases, an all over coating method could be used, e.g. if the focussing element array is to be formed all over the support 201 or if the method variants described below with respect to FIGS. 6 and 7 are utilised. The curable material 205 is applied to the support 201 in an uncured (or at least not fully cured) state and therefore may be fluid or a formable solid.

The support 201 is then conveyed to a casting module 220 which here comprises a casting tool 221 in the form of a cylinder carrying a surface relief 225 defining the shape of the focussing elements which are to be cast into the curable material 205. As each region 202 of curable material 205 comes into contact with the cylinder 221, the curable material 205 fills a corresponding region of the relief structure, forming the surface of the curable material into the shape defined by the relief. The cylinder 221 could be configured such that the relief structure 225 is only provided at regions corresponding to shape and position of the first regions 202 of curable material 205. However this gives rise to the need for accurate registration between the application module 210 and the casting module 220 in order that the focussing elements are accurately placed in each first region 202 of the curable material. Therefore in a particularly preferred example, the cylinder 221 carries the relief structure corresponding to the focussing elements over an area larger than that of the first region 202, preferably around its complete circumference and most preferably over substantially its whole surface (although axial regions which will not come into the vicinity of the curable material may be excluded). In this way, each entire first region 202 of curable material 205 is guaranteed to come into contact with the surface relief structure 225 such that the focussing element array is formed over the full extent of the material. As a result, the shape, size and location of the focussing element array 20 is determined solely by the application of the curable material by the application module.

Having been formed into the correct surface relief structure, the curable material 205 is cured by exposing it to appropriate curing energy such as radiation R from a source 222. This preferably takes place while the curable material is in contact with the surface relief 225 although if the material is already sufficiently viscous this could be performed after separation. In the example shown, the material is irradiated through the support layer 201 although the source 222 could alternatively be positioned above the support layer 201, e.g. inside cylinder 221 if the cylinder is formed from a suitable transparent material such as quartz.

FIG. 5 shows variants of the above process in which, rather than apply the curable material 205 to the support layer 201, it is applied instead to the surface of the casting cylinder 225. Again this is preferably done in a patterned manner, using a print cylinder 211 to transfer the curable material 205 only onto the first regions 202 on the casting cylinder 221. Upon contact with the support layer 201, the regions 202 of curable material 205 affix to the support layer 205 and curing preferably takes place at this stage to ensure strong bonding. The so-formed focussing element arrays 20 again have a shape, size and location determined solely by the application module 210.

FIG. 5(c) illustrates an alternative implementation in which rather than apply the curable material 205 to the support layer 201 or the casting cylinder 221 in a patterned manner to define the first regions 202, the casting cylinder 221' is modified to achieve such patterning. Thus, the surface relief 225 defining the focussing element array is only provided in discrete patches of the surface of the casting cylinder 221' with the intervening areas having no surface relief. The curable material 205 can be applied all over the surface of casting cylinder 221', e.g. from a reservoir as shown or from an applicator roller. The curable material 205 fills at least the relief regions 225 and if any is collected on the intervening surface regions, a removal device such as a doctor blade or squeegee 213' may be provided to clear those areas. The support layer 201 is brought into contact with the cylinder 221', preferably in a wrap configuration as shown, and the curable material 205 is exposed to appropriate curing energy R from a source 222, preferably during contact as shown. The support layer 201 is then separated from the cylinder 221' and now carries discrete patches of focussing element arrays 20 in respective first regions 202.

In all of the above examples, preferably the first regions 202 have the form of indicia, such as an alphanumeric character, a symbol, logo or other item of information to increase the complexity of the design.

The surface relief 225 may be carried by cylinder 221 in the form of a sheet embossed or otherwise provided with the required relief, which is wrapped around the cylinder 221 and clamped in place. This may result in a noticeable join 225a where the two ends of the sheet meet, at which there is a discrepancy in the relief pattern. If replicated into one of the focussing element arrays this would cause a reduction in quality. It is therefore preferred that the casting module is at least coarsely registered to the application module so that the location of join 225a where it contacts support 201 does not coincide with any of the first regions 202 but rather is located between them, as shown by the example location labelled 225b. In cases where the curable material is applied (and retained) all over the support, or at least along a continuous strip in the machine direction MD, this join 225a is still preferably positioned outside the first region which is to be used to form the security device, advantageously in a location which will subsequently be coated with one of the opacifying layers 3. To achieve this consistently it is desirable for the process for forming the focussing element array to be registered with the opacifying layer application process, e.g. performed in the same in-line process.

FIGS. 6 and 7 show an alternative cast-cure process for forming the focussing element array according to another comparative example. Again, components corresponding to those described above are labelled with the same reference numerals used previously and will not be described in detail again. In this case, the shape, size and location of each focussing element array is determined not by the initial application of the curable material 205 to the support layer 201 but by selective curing of that material.

Referring first to FIG. 6, here the application module 210 applies the curable material over not only the first regions 202 in which the focussing element array is ultimately to be located, but additionally over a second region 203 such that in this example substantially the whole of the first surface of the support layer 201 is coated with the curable material 205. Thus whilst in the example shown the application module is still constituted by a printing system as described previously (but in which the cylinder 211 defines a print area substantially over the whole area of the support as described here), this could be replace by a non-selective, all over coating module. The curable material 205 is then brought into contact with the casting tool 220 which again in this case is preferably provided with the appropriate surface relief 225 over substantially the whole of its circumference. Thus, the whole of the first and second regions 202, 203 of the curable material are formed in accordance with the relief structure. However, only selected portions of the material are cured. This can be achieved by providing a mask 223 through which the curable material 205 is exposed to the curing energy, e.g. UV radiation. The mask 223 defines radiation-transparent portions corresponding to the first regions 202 and radiation-opaque portions in between such that the second region 203 of the curable material is not cured. In this example, the radiation source 222 is located inside the casting cylinder 221 and the mask 223 is also arranged on the inside of that cylinder.

A removal module 230 is additionally provided to remove the uncured material 205 from the second region 203, leaving only the cured material in the first regions 202, bearing the desired surface relief and thereby forming the focussing element arrays 20. The removal module 230 can comprise a cleaning roller 231 with a (preferably soft) surface to which the uncured material 205 will adhere and be lifted off the support 201. A cleaning system such as a doctor blade or squeegee 232 may be provided to remove the waste material 205 from the roller 231.

In a variant of the FIG. 6 example, the patterned mask 223 and curing energy source 222 may be arranged on the other side of the transport path, as shown in FIG. 7. Here the support layer 201 is conveyed through a nip defined between the casting cylinder 221 and a mask cylinder 223 arranged to move at substantially the same speed as one another. In other respects the FIG. 7 apparatus is the same as that of FIG. 6.

In both variants, any join 225a in the surface relief on the casting cylinder is preferably aligned with one of the opaque portions of the mask 223 such that the area of material 205 into which that part of the surface relief is formed will not be cured and is removed by station 230.

In both variants, the curable material 205 could be applied to the surface of the casting cylinder 221 instead of onto the support later 201, e.g. using an arrangement corresponding to that shown in FIG. 5.

Embodiments of methods for forming a focussing element array in accordance with the present invention will now be discussed with reference to FIG. 8 onward. Again, these involves cast-curing and any of the method variants described above could be employed for application of the curable material(s) 205 and forming thereof. However, an additional layer, referred to as a pedestal layer 249, is formed between the curable material(s) in which the focussing element array is defined and the support layer 201. The pedestal layer can be used to provide a number of different functions as discussed below and generally increases the freedom of design.

Figure 8A:
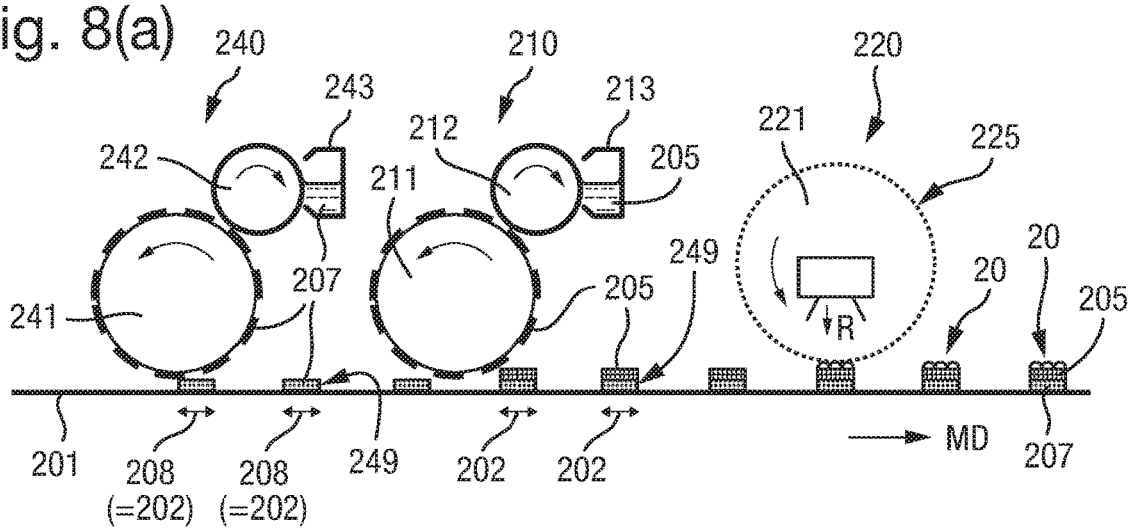

Thus FIG. 8(a) shows an exemplary process in which, prior to application of the curable material 205 to the support layer 201, a pedestal layer 249 is formed by applying another transparent material 207 to the support layer 201, using pedestal application module 240. Again this could involve printing or coating the transparent material 207 onto the support layer using any of the same methods as previous mentioned for the application of curable material 205, such as gravure printing. The pedestal material 207 is preferably applied in a selective manner to certain areas 208 of the support layer 201, but it could be applied all-over. The pedestal material 207 does however need to cover at least the first regions 202 in which the focussing element arrays are to be formed. In the example depicted, the areas 208 to which the pedestal material 207 is applied are coincident with the first regions 202, but this is not essential, and indeed may not be desirable since this gives rise to greater registration requirements. In more preferred examples, the areas 208 to which the pedestal material 207 is applied are each larger than the extent of the respective focussing element array to be formed thereon, at least in the machine direction MD. This reduces the accuracy with which the lens application and formation stage must be registered to the pedestal application stage.

The transparent material 207 forming the pedestal layer may or may not also be a curable material. If not, the transparent material is preferably dried or otherwise solidified sufficiently before proceeding. If the material is curable, it may be cured during application from cylinder 241 or after, possibly at the same time as curing the curable material 205. However, preferably at least partial curing of material 207 takes place before curable material 205 is applied, which takes place at application station 210. The curable material 205 can be applied in the same way as previously described but now is applied onto the pedestal layer rather than onto the support layer 201. The curable material is then brought into contact with the casting tool 221 at casting station 220 in the same manner as previously described, and the focussing element array formed and cured into material 205.

Of course, the curable material 205 could be applied, formed and cured using any of the method variants described above, e.g. applying the material 205 to the casting cylinder 221 instead of the pedestal layer, applying more than one curable material 205 to different sub-regions of the pedestal layer and/or performing selective curing.

Figure 8B:
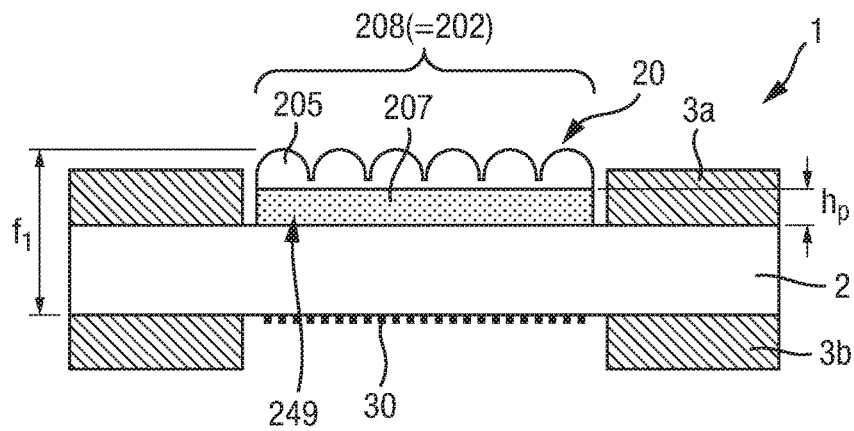

FIG. 8(b) shows a portion of a security document 1 in cross section 1 carrying a focussing element array 20 formed using a process such as that of FIG. 8(a). It will be seen that the focussing element array 20 is formed in material 205 which sits on top of the pedestal layer 249, here formed of material 207. The pedestal layer can perform one or more of the following functions. Firstly, the pedestal layer 249 can act as a further optical spacer increasing the available distance between the focussing element array and any image array 30 provided. As shown in FIG. 8(b), the focal length $f_1$ of the focussing element array 20 is provided by the polymer substrate 2, the pedestal layer 249 and the lenses themselves. By locally increasing the available optical spacing, the size of the lenses can be increased and the necessary constraints on the resolution of the image array 30 reduced (discussed in section 3), without needing to increase the overall thickness of the security document 1. The pedestal layer 249 can also be used to compensate for local variations in the thickness of the polymer substrate 2, e.g. using a feedback system to control the application of the material 207. The height $h_p$ of the pedestal layer may be in the region of 1 to 50 microns, more preferably 2 to 30 microns, most preferably 5 to 30 microns, for example, depending on the function(s) it is required to perform.

A local increase in thickness caused by the pedestal layer 249 could lead to problems stacking the security documents. Therefore, to avoid this problem, pedestal areas of comparable height could be provided at spaced locations across the area of the security document so that the document stack remains substantially even. These additional pedestals may or may not carry focussing element arrays.

The pedestal layer can also be used to improve the robustness of the focussing element array 20 by forming the pedestal layer 249 from a material 207 which is more flexible than the material 207 from which the lenses themselves are formed. For example, the material 207 may be elastomeric and/or having a lower degree of cross-linking than the material 205 (if indeed both are cross linked). For instance, the pedestal material 207 may have only a moderate degree of cross linking (e.g. 50% or less) compared with the lens material 205. The pedestal material could for example be formed of an aliphatic urethane acrylate with fewer side chains/functional groups compared with that forming the lens material 205, and/or a higher oligomer content than that of the lens material 205. By forming the pedestal layer 249 of a material which is more flexible than the lens material in this way, it acts as a transition zone with mechanical properties in between those of the polymer substrate 2 and those of the lens material 205, which is typically relatively hard, rigid and brittle. As such, the pedestal layer acts to absorb deflections suffered by the security document 1 during handling, e.g. bending, folding or flexing, reducing their transmission to the lens material 205 and therefore preventing damage to the lens structure. Also the provision of a flexible pedestal layer reduces the overall volume of the lens material 205 required (unless it is also needed to increase the optical spacing) which decreases the overall stiffness of the construction.

Preferred flexible materials suitable for forming the pedestal layer include those containing a substantial (e.g. at least 60%) amount of mono or di-functional Urethane- or Polyester-Acrylate Oligomers, in particular those with long chain lengths (e.g. molecular weight greater than 2500). By contrast hard and brittle formulations (as might be used to form the curable material 205) may include be those containing substantial (e.g. at least 60%) amount of Tri or higher functionality monomers, especially normal acrylic monomers or those containing similar high amounts of tri or higher functionality oligomers with shorter chain lengths (e.g. molecular weight much less than 2500).

Some examples of soft and hard urethane acrylates are given below:

Flexible Urethane Acrylates:
  BASF AG: Laromer 19T, Laromer 9028V, Laromer 9030V, Laromer 9033V
  Bayer AG: Desmolux VP LS 2220, Desmolux VP LS 2258, Desmolux XP
  LS 2413, Desmolux XP LS 2430, Desmolux XP LS 2989

Cognis: Photomer 6230, Photomer 6891, Photomer 6008, Photomer 6210, Photomer 6891

Cytec: Ebecryl 401, Ebecryl 8307, Ebecryl 8402, Ebecryl 8406

Sartomer: Craynor CN966H90, Craynor CN965, Craynor CN9001, Craynor CN936

Rahn: Genomer 4188/EHA, Genomer 4215, Genomer 4296/1122

Hard Urethane Acrylates:

BASF AG: Laromer LR 8987, Laromer 9029V, Laromer 9048V, Laromer 9050V

Bayer AG: Desmolux VP LS 2265, Desmolux VP LS 2308

Cognis: Photomer 5543, Photomer 4666, Photomer 6623, Photomer 6613

Cytec: Ebecryl 1290, Ebecryl 8305, Ebecryl 264

Sartomer: Craynor CN922, Craynor CN925, Craynor CN975, SR368, SR399LV

Rahn: Genomer 4302 and Genomer 4590

As an alternative or in addition to the use of a flexible material, the pedestal layer 249 can be used to increase the visual complexity of the device. For example, the pedestal layer 249 may be optically detectable, e.g. with a coloured tint and/or UV fluorescence. In a development of this the pedestal layer can be formed of more than one transparent materials 207a, 207b with different optical detection characteristics, applied to laterally offset sub-regions 208a, 208b of the area to which the pedestal is applied. This can be achieved by providing more than one pedestal application module 240, or by applying both in a patterned manner to a transfer roller or blanket. The curable material 205 can then be applied to the top of the patterned pedestal layer 249 in the same manner as shown in FIG. 8(a). Again, for registration reasons it may be desirable for the pedestal layer 249 as a whole to extend beyond the extremities of the focussing element array, though of course the individual sub-regions may be (and preferably will be) smaller than the full array area.

FIG. 9 shows exemplary manufacturing apparatus for carrying out such a process. Components are indicated using reference numerals corresponding to those of FIG. 8(a). Thus at a first pedestal application module 240a, a first transparent material 207a is applied selectively to a first sub-region 208a on the support layer 201. In this example the material 207a is applied to a patterned gravure roller 241a from a reservoir 243a and a removal means 243a' such as a doctor blade is provided for removing any excess material. If necessary, the support layer is then conveyed through a drying and/or curing section 245a to fix the material 208a. Whether the section 245a involves drying and/or curing will depend on the nature of the material 208a. Next the support layer 201 is conveyed through a second pedestal application module 240b at which a section transparent material 207b, e.g. of different colour, is applied selectively to a second sub-region 208b of the support layer 201, in register with the first material 207a. The apparatus of the second pedestal application module 240b corresponds to that of the first pedestal application module 240a in this example, Again, a drying and/or curing section 245b may be provided for fixing the second material 207b. The transparent curable material 205 from which the focussing elements are to be formed is then applied on top of the pedestal materials 207a,b at station 210. In this example, this comprises a patterned gravure cylinder 211 onto which the curable material 205 is applied from a reservoir 213, a doctor blade 213' or similar being provided to remove excess. The support layer 201 is then wrapped around a casting cylinder 221 carrying a surface relief 225 to form the desired focussing elements into the material 205.

Figure 10A:
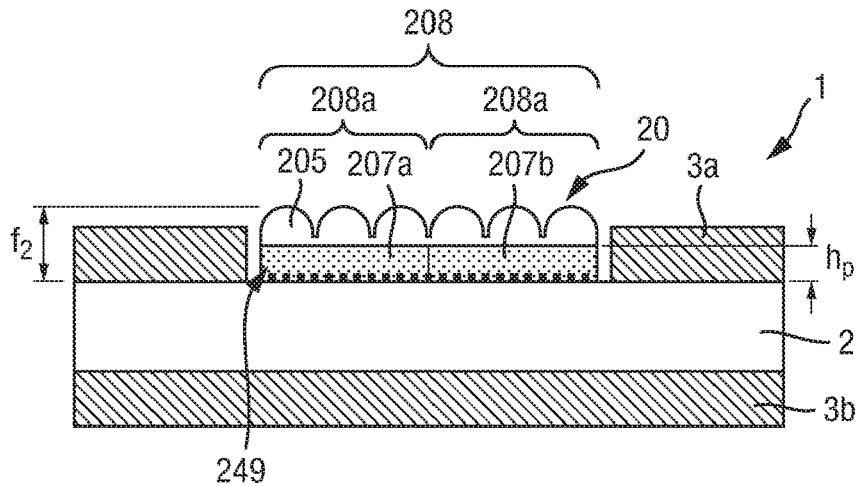

FIG. 10(a) shows a portion of a security document 1 having a focussing element array formed in this way. Here, a first sub-region 208a of the pedestal layer 249 is formed of a first transparent material 207a and a section adjacent sub-region 208b is formed of a second transparent material 207b with different optical detection characteristics, e.g. colour. The two materials are preferably arranged so as to convey a pattern or indicia. Of course, more than two materials could be utilised if desired.

Many different visual effects can be achieved through forming the pedestal layer of two or more materials with different optical characteristics, e.g. colours, in this way. For instance, FIG. 10(b) shows another exemplary security device, (i) in cross-section and (ii), (iii) in plan view from two different viewing angles. The focussing element array 20 and pedestal layer 249 each as a whole covers a rectangular area (the "first region"). Within that area, a central circular area is formed by one sub-region 208b of the pedestal layer 249, in which the pedestal layer is formed of a transparent material 207b carrying a coloured tint, e.g. yellow, whilst the remainder of the rectangle surrounding (and abutting) the circle is formed of another sub-region 208a in which the pedestal layer is clear and colourless (material 207a). In this example, the image array 30 provided on the opposite surface of transparent substrate 2 comprises first image elements 31 formed for example of a dark ink (e.g. black) or metal, spaced by second image elements 32 which are relatively light (e.g. white ink) or may be blank (i.e. carrying no material). The image elements 31, 32 are arranged to form a two-channel lenticular array which is uniform across the whole rectangular area. For example, the first image elements 31 may be rectilinear elongate strip elements regularly spaced from one another across the device by elements 32. When the device is viewed at a first viewing angle by observer $O_1$, the focussing elements act to direct light from the first image elements to the observer across the whole device. Thus, the outer sub-region 208a takes on the colour of the first image elements 31, e.g. black or metallic. The central, circular sub-region also displays the first image elements 31 but here their colour is modified by that of the tint in the pedestal material 207b, e.g. causing the circle to appear brown or metallic yellow. When the viewing angle is changed to that of observer $O_2$, now the device again displays two colours alongside one another, but these are different colours from those seen by the first observer $O_1$. This is because the focussing elements 20 are now directing light from the second image elements 32 to the viewer. Hence in the outer sub-region 208a, the device displays the colour of the second image elements 32 which may for example be white or even transparent. The central circular sub-region meanwhile displays a colour modified by that of the material 207b and hence in this case it may appear yellow. Thus by providing the pedestal layer in two colours, a device has been achieved which displays a total of four different colours as it is tilted, despite the use of a standard, single colour image array 30. Further, the relative arrangement of the two colours visible alongside one another at any one viewing angle is determined by the lateral positioning of the two sub-regions of the pedestal layer, which can be controlled through the methods described above, and also does not require modification of the image array 30.

It will be appreciated that whilst in this example the sub-regions are arranged as a circular area against a rectangular background, any desirable arrangement of sub-regions could be implemented. In preferred cases, one or more of the subs-regions, of a combination of two or more of the sub-regions, are formed of indicia, e.g. to convey an item of information. For instance, the sub-regions may define one or more alphanumeric characters, particularly letters or numbers, symbols, logos, graphics or the like. In general it is preferred if one sub-region is entirely surrounded by another sub-region, which provides a background area.

In the FIG. 10(b) example, the image elements 31 are typically of high optical density, e.g. opaque, and the device may be configured primarily for viewing in reflected light. However, in other cases it is desirable for the image elements of array 30 to be formed in a colour which combines with those carried by the pedestal layer 249 so as to generate further colours, e.g. when viewed in transmissive light or against a reflective surface (such as a white background). Thus the image elements 31 may be translucent or transparent with a coloured tint. FIG. 10(c) shows such an example, the structure of which is substantially the same as that of FIG. 10(b) except here the sub-regions 208a,b of the pedestal layer 249 are arranged as two adjacent rectangles, and image array 30 is formed of coloured elements 31, e.g. green. The pedestal layer materials 207a, b are colourless in sub-region 208a and yellow in sub-region 208b. Thus, observer $O_1$ sees sub-region 208a as a green rectangle and adjacent sub-region 208b as a rectangle in a different shade of green (relatively more yellow than that of sub-region 208a). At the different viewing angle of observer $O_2$, now the two rectangles appear white/colourless (sub-region 208a) and yellow (sub-region 208b), respectively. Thus once again four colours have been exhibited.

Of course, three or more different transparent materials could be applied to form the pedestal layer 249 by extending the above principles as necessary.

FIG. 10(d) shows another alternative implementation of a security device making use of a pedestal layer 249', in (i) cross-section and (ii), (iii) in plan view from two different viewing angles. The construction is generally similar to that of the devices in FIGS. 10(b) and (c), except that here the pedestal layer 249' comprises a single transparent material 207 (although it could comprise multiple such materials as in the preceding embodiments) in a first sub-region 208a, and additionally comprises a non-transparent material 207' in a second sub-region 208b. The non-transparent material 207' need not be opaque (although this may be preferred) but will not be optically clear, meaning that the underlying image array 30 cannot be clearly viewed through the material 207'. For example, the material 207' could be an optically scattering, translucent material such as a white ink as may be used to form opacifying layers in other examples herein. The arrangement of the non-transparent material 207' effectively defines the boundaries of the optically active area of the device, i.e. the optical effect generated by the focussing elements 20 in combination with the image array 30 will only be exhibited in the first sub-region 208a of the device and not in the second sub-region 208b, which will appear optically static. In this example, the image array 30 is implemented as an array of microimages configured with a pitch and orientation such that they co-operate with the focussing element array 30 to generate magnified versions of the microimages due to the moiré effect. FIG. 10(d) (ii) shows the appearance of the device from the point of view of observer $O_1$ illustrating the central optically active sub-region 208a (which here has the shape of a star) surrounded by an optically invariable sub-region 208b which has the colours of the non-transparent material 207'. Observer $O_2$ sees substantially the same arrangement from his viewing angle, but within the sub-region 208a the magnified images have moved laterally relative to their previous position, due to the moiré effect. Of course, multiple non-transparent materials 207' could be provided in a pattern to further increase the visual impact of the static sub-regions.

In all of the above methods, the one or more transparent curable materials 205 in which the lenses are formed can be of various different compositions.

FIG. 11 shows a further embodiment comprising a flexible pedestal layer 249 formed as previously described, where each of the focussing elements 20a formed thereon is spaced from the next by a distance s (which is preferably regular across the array 20 but this is not essential). By spacing all the focussing elements apart in this way, the flexibility of the arrangement, and hence its robustness, is further enhanced. It will be appreciated that the pedestal layer 249 is formed of a material 207 which is flexible relative to the material 205 from which the focussing elements themselves are made.

Figure 12A:
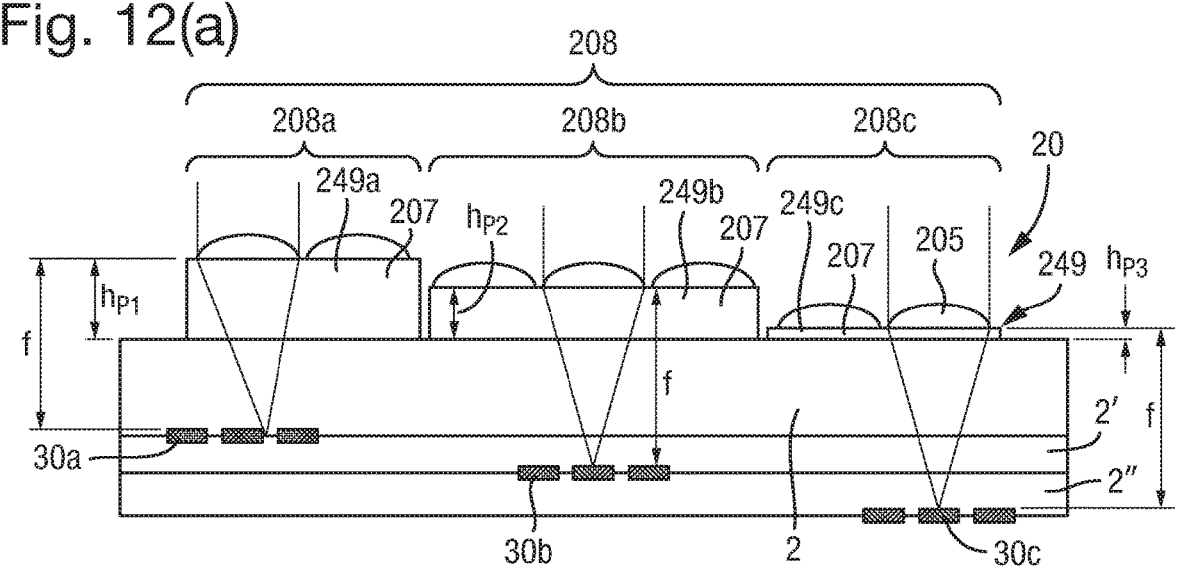

In the examples so far, the pedestal layer 249 has been formed with a uniform height across the whole of the first region in which the focussing element array 20 is formed. However, the pedestal layer 249 can also be used to vary the focal position of the focussing elements between sub-regions of the array by varying its height accordingly. FIGS. 12(a), (b) and (c) depict three embodiments of security devices in which this is the case. In the FIG. 12(a) example, the focussing element array 20 is provided across a first region 208 which is divided into three sub-regions 208a, b and c. In this example, the shape and size, and hence the focal length f, of the focussing elements in all three sub-regions is the same, although this two could be varied if desired. In the first sub-region 208a, the pedestal layer 249a is formed with a first height $h_{p1}$, which positions the focal plane of the focussing elements in that sub-region approximately on the opposite surface of substrate 2, where a first image array 30a is provided. As such, the first sub-region 208a exhibits a focussed image of the image array 30a which may provide an optically variable effect of one the sorts described above.

In the second sub-region 208b, the pedestal layer 249b here has a second height $h_{p2}$ which is less than $h_{p1}$. This has the result that the focussing elements in this sub-region focus on a more distant plane than those in the first sub-region 208a and in this example a second image array 30b is provided approximately at the appropriate focal position by laminating a second substrate 2' to the first which carries this array. Thus, in the second sub-region 208b, a focussed image of the second image array 30b is exhibited (which may again be an optically variable effect). Similarly, in the third sub-region 208c, here the pedestal layer has a third height $h_{p3}$ which is less than $h_{p1}$ and $h_{p2}$, with the result that the focussing elements in this region focus on a still more distant plane. Again, a third image array 30c may be provided at the appropriate distance by laminating a third substrate 2" to the second substrate 2' which carries this further array 30c. Hence in the third sub-region 208c, a focussed image of the third image array is exhibited (which may again be an optically variable effect). This arrangement has the advantage that multiple different image arrays 30a, 30b, 30c can be provided, e.g. in different colours and/or carrying different information, and which is displayed in each sub-region can be determined through controlling the height of the pedestal layer in each sub-region.

It should be appreciated that whilst the Figure only depicts each image array 30a, b, c as being present in the respected sub-region where it is visible, in practice each array may be provided continuously across the whole device area. Provided the intermediate arrays 30a, 30b are sufficiently transparent (e.g. each having a fill factor below 50% and/or being formed of non-opaque image elements), their presence will not significantly interfere with visualisation of the image array on which the focussing elements are focussed. For instance in region 208c since the image arrays 30a and 30b will be out of focus they will not significantly impede visualisation of the in-focus array 30c.

The height of the pedestal layer 249 in each sub-region can be controlled by appropriate adjustment of the process parameters in the process by which the pedestal material is applied, e.g. printing, using techniques which will be known to the skilled person.

Figure 12B:
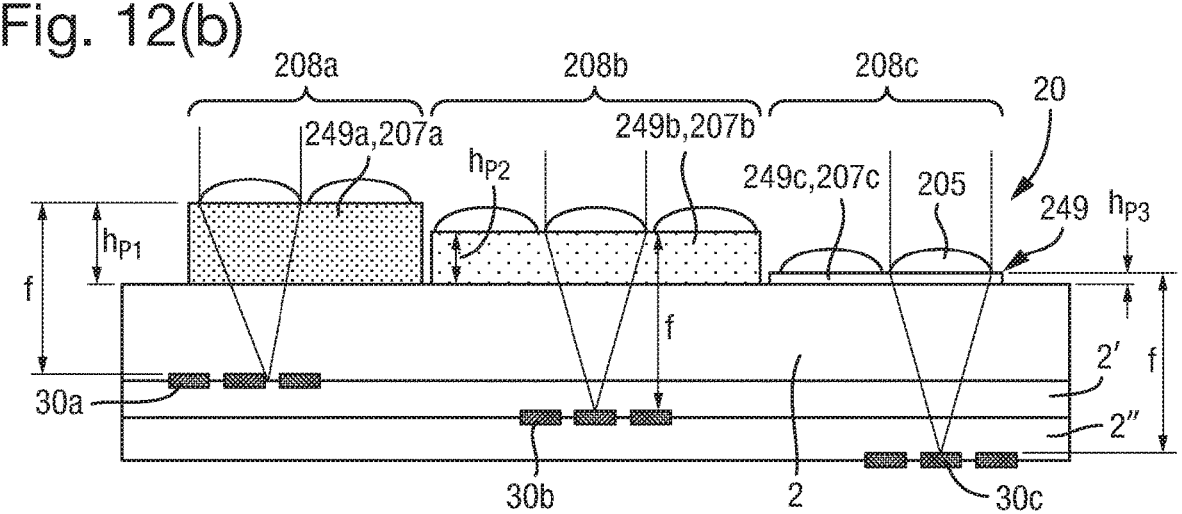

FIG. 12(b) shows a variant of the above embodiment in which, rather than form the pedestal layer 249 out of the same transparent material 207 in all three sub-regions, a different transparent material 207a,b,c is used to form the pedestal layer in each one. The different transparent materials preferably have different optical characteristics, e.g. colours, so in one example the material 207a forming pedestal 249a in sub-region 208a may carry a blue tint, the material 207b forming pedestal 249b in sub-region 208b may carry a yellow tint, and the material 207c forming pedestal 249c in sub-region 208c may be colourless. Otherwise, the construction is the same as in the FIG. 12(a) embodiment with the result that the three different image arrays 30a,b,c are exhibited in each respective sub-region. However now the colour(s) in which each are visualised will be modified by the colours of the different pedestal layers, thereby further increasing the complexity of the device.

Figure 12C:
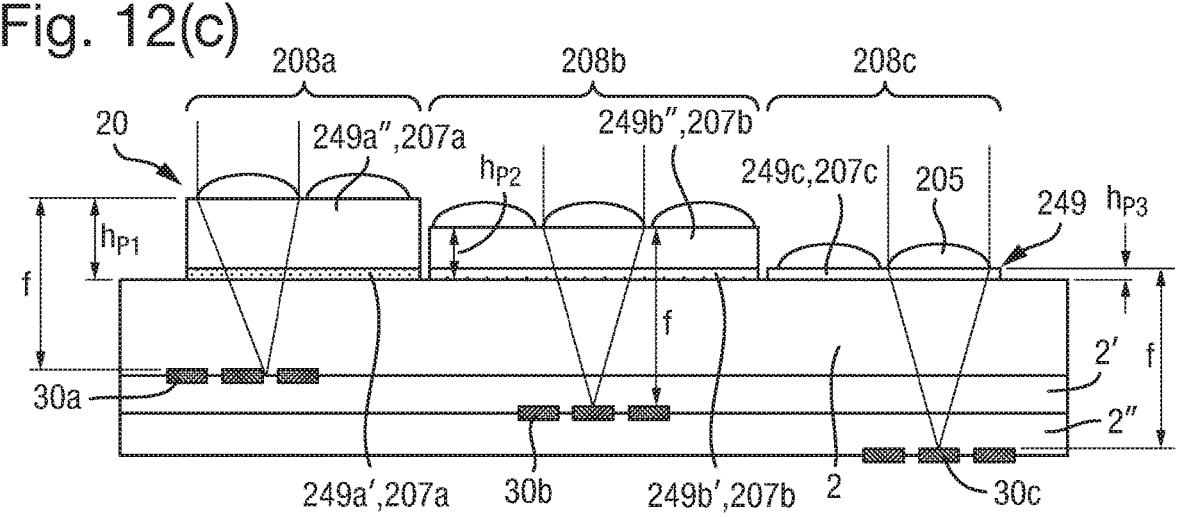

The embodiment shown in FIG. 12(c) is a variant of that shown in FIG. 12(b) where, instead of replacing the whole of the pedestal layer in each sub-region with one of a different colour, now in sub-regions 208a and 208b the respective pedestals are each formed of two layers on top of one another which collectively provide the desired pedestal heights. Hence in sub-region 208a, a first pedestal sub-layer 249a' is provided, formed from coloured material 207a, under a second pedestal sub-layer 249a" which is formed of colourless material 207c (i.e. the same as the material in sub-region 208c). Similarly, in sub-region 208b, a first pedestal sub-layer 249b' is provided, formed from coloured material 207b, under a second pedestal sub-layer 249b" which is formed of colourless material 207c. The visual effect is the same as in the previous embodiment.

In all embodiments, the curable material 205 is preferably radiation-curable and may comprise a resin which may typically be of one of two types, namely:

a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.

b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing will typically be UV radiation but could comprise electron beam, visible, or even infra-red or higher wavelength radiation, depending upon the material, its absorbance and the process used. Examples of suitable curable materials include UV curable acrylic based clear embossing lacquers, or those based on other compounds such as nitro-cellulose. A suitable UV curable lacquer is the product UVF-203 from Kingfisher Ink Limited or photopolymer NOA61 available from Norland Products. Inc, New Jersey.

The curable material 205 could itself also be elastomeric and therefore of increased flexibility. An example of a suitable elastomeric curable material is aliphatic urethane acrylate (with suitable cross-linking additive such as polyaziridine). Alternatively, any of the materials identified above as suitable for forming a flexible pedestal layer 249 could be used as the curable material 205.

As noted above, the provision of an image array 30 is optional but preferred. It is particularly advantageous to provide an image array configured to co-operate with the focussing element array 20 to produce an optically variable effect. For example, the image array 30 and focussing element array 20 may, in combination, form a moiré magnification device, an integral imaging device or a lenticular device, the mechanism on which each operates having been discussed above.

Security devices of the above types depend for their optical effect at least in part upon the high resolution with which the image array 30 has been produced. For instance, in a lenticular device, each image element or "slice" making up image array 30 must be narrower than the pitch of the focussing element array 20, which as discussed above is typically no more than 100 microns, usually less. For example, if the diameter of the focusing elements is 30 μm then each image element may be around 15 μm wide or less. Alternatively for a smooth lenticular animation effect it is preferable to have as many different interleaved images as possible, typically at least five but ideally as many as thirty. In this case the size of the image elements should be in the range 0.1 to 6 μm. In practice, in a lenticular device, the width of the image elements is directly influenced by two factors, namely the pitch of the focusing element (e.g. lens) array and the number of image elements required within each lens pitch or lens base width. The former however is also indirectly determined by the thickness of the lenticular device. This is because the focal length for a plano-convex lens array (assuming the convex part of the lens is bounded by air and not a varnish) is approximated by the expression $r/(n-1)$, where r is the radius of curvature and n the refractive index of the lens resin. Since the latter has a value typically between 1.45 and 1.5 then we may say the lens focal approximates to 2r. Now for a close packed lens array, the base diameter of the lens is only slightly smaller than the lens pitch, and since the maximum value the base diameter can have is 2r, it then follows that the maximum value for the lens pitch is close to the value 2r which closely approximates to the lens focal length and therefore the device thickness.

To give an example, for a security thread component as may be incorporated into a banknote, the thickness of the lenticular structure and therefore the lens focal length is desirably less than 35 μm. Let us suppose we target a thickness and hence a focal length of 30 μm. The maximum base diameter we can have is from the previous discussion equal to 2r which closely approximates to the lens focal length of 30 μm. In this scenario the f-number, which equals (focal length 1 lens base diameter), is very close to 1. The lens pitch can be chosen to have a value only a few μm greater than the lens diameter—let us choose a value of 32 μm for the lens pitch. It therefore follows for a two channel one-dimensional lenticular device (i.e. two image element strips per lens) we need to fit two image strips into 32 μm and therefore each strip is 16 μm wide. Similarly for a four channel one-dimensional lenticular the printed line width requirement drops down to 8 µm (in this example).

As a result, the f-number of the lens should preferably be minimised, in order to maximise the lens base diameter for a given structure thickness. For example suppose we choose a higher f-number of 3, consequently the lens base diameter will be 30/3 or 10 µm. Such a lens will be at the boundary of diffractive and refractive physics—however, even if we still consider it to be primarily a diffractive device then the we may assume a lens pitch of say 12 µm. Consider once again the case of a two channel device, now we will need to print an image strip of only 6 µm and for a four channel device a strip width of only 3 µm.

Similar considerations apply to other types of devices. For example, in moiré magnifiers and integral imaging devices, each microimage must be of the same order of magnitude as one lens, or smaller. Thus, the microimage will typically have overall dimensions of 50 microns or less. In order to provide the microimage with any detail, small line widths are required, e.g. of 15 microns or preferably less, ideally 5 microns or less.

Conventional printing techniques will generally not be adequate to achieve such high resolution. For instance, typical printing processes used to manufacture pattern elements (image arrays) for security devices include intaglio, gravure, wet lithographic printing and dry lithographic printing. The achievable resolution is limited by several factors, including the viscosity, wettability and chemistry of the ink, as well as the surface energy, unevenness and wicking ability of the substrate, all of which lead to ink spreading. With careful design and implementation, such techniques can be used to print pattern elements with a line width of between 25 µm and 50 µm. For example, with gravure or wet lithographic printing it is possible to achieve line widths down to about 15 µm. However, consistent results at this resolution are difficult to achieve and in any case this level of resolution still imposes a significant limitation on the security device. Thus while any of the above-mentioned techniques can be employed in embodiments of the present invention, higher resolution methods (i.e. suitable for achieving smaller line widths) for forming the image array 30 would be highly desirable.

One method which has been put forward as an alternative to the printing techniques mentioned above, and can be employed in embodiments of the invention, is used in the so-called Unison Motion™ product by Nanoventions Holdings LLC, as mentioned for example in WO-A-2005052650. This involves creating pattern elements ("icon elements") as recesses in a substrate surface before spreading ink over the surface and then scraping off excess ink with a doctor blade. The resulting inked recesses can be produced with line widths of the order of 2 µm to 3 µm.

A different method of producing high-resolution image elements is disclosed in WO-A-2015/044671 and is based on flexographic printing techniques. A curable material is placed on raised portions of a die form only, and brought into contact with a support layer preferably over an extended distance. The material is cured either whilst the die form and support layer remain in contact and/or after separation. This process has been found to be capable of achieving high resolution and is therefore advantageous for use in forming the image array 30 in the present application.

Some more particularly preferred methods for generating patterns or micropatterns (i.e. an image array 30) on a substrate are known from US 2009/0297805 A1 and WO 2011/102800 A1. These disclose methods of forming micropatterns in which a die form or matrix is provided whose surface comprises a plurality of recesses. The recesses are filled with a curable material, a treated substrate layer is made to cover the recesses of the matrix, the material is cured to fix it to the treated surface of the substrate layer, and the material is removed from the recesses by separating the substrate layer from the matrix.

Another strongly preferred method of forming a micropattern is disclosed in WO 2014/070079 A1. Here it is taught that a matrix is provided whose surface comprises a plurality of recesses, the recesses are filled with a curable material, and a curable pickup layer is made to cover the recesses of the matrix. The curable pickup layer and the curable material are cured, fixing them together, and the pickup later is separated from the matrix, removing the material from the recesses. The pickup layer is, at some point during or after this process, transferred onto a substrate layer so that the pattern is provided on the substrate layer.

The above-mentioned methods described in US 2009/0297805 A1, WO 2011/102800 and WO 2014/070079 A1 have been found to produce particularly good results and are therefore particularly preferred for use in forming the image array 30 in embodiments of the invention.

In other examples the image array 30 can be formed by a relief structure and a variety of different relief structure suitable for this are shown in FIG. 13. Thus, FIG. 13a illustrates image regions of the image elements (IM), in the form of embossed or recessed regions while the non-embossed portions correspond to the non-imaged regions of the elements (NI). FIG. 13b illustrates image regions of the elements in the form of debossed lines or bumps.

In another approach, the relief structures can be in the form of diffraction gratings (FIG. 13c) or moth eye/fine pitch gratings (FIG. 13d). Where the image elements are formed by diffraction gratings, then different image portions of an image (within one image element or in different elements) can be formed by gratings with different characteristics. The difference may be in the pitch of the grating or rotation. This can be used to achieve a multi-colour diffractive image which will also exhibit a lenticular optical effect such as an animation through the mechanism described above. For example, if the image elements had been created by writing different diffraction tracks for each element, then as the device is tilted, lenticular transition from one image to another will occur as described above, during which the colour of the images will progressively change due to the different diffraction gratings. A preferred method for writing such a grating would be to use electron beam writing techniques or dot matrix techniques. Using a diffractive structure to provide the image elements provides a major resolution advantage: although ink-based printing is generally preferred for reflective contrast and light source invariance, techniques such as modern e-beam lithography can be used generate to originate diffractive image strips down to widths of 1 µm or less and such ultra-high resolution structures can be efficiently replicated using UV cast cure techniques.

Such diffraction gratings for moth eye/fine pitch gratings can also be located on recesses or bumps such as those of FIGS. 13a and b, as shown in FIGS. 13e and f respectively.

FIG. 13g illustrates the use of a simple scattering structure providing an achromatic effect.

Further, in some cases the recesses of FIG. 13a could be provided with an ink or the debossed regions or bumps in FIG. 13b could be provided with an ink. The latter is shown in FIG. 13h where ink layers 200 are provided on bumps 210. Thus the image areas of each image element could be created by forming appropriate raised regions or bumps in a resin layer provided on a transparent substrate. This could be achieved for example by cast curing or embossing. A coloured ink is then transferred onto the raised regions typically using a lithographic, flexographic or gravure process. In some examples, some image elements could be printed with one colour and other image elements could be printed with a second colour. In this manner when the device is tilted to create the lenticular animation effect described above, the images will also be seen to change colour as the observer moves from one view to another. In another example all of the image elements in one region of the device could be provided in one colour and then all in a different colour in another region of the device.

Finally, FIG. 13*i* illustrates the use of an Aztec structure.

Additionally, image and non-image areas could be defined by combination of different element types, e.g. the image areas could be formed from moth eye structures whilst the non-image areas could be formed from gratings. Alternatively, the image and non-image areas could even be formed by gratings of different pitch or orientation.

Where the image elements are formed solely of grating or moth-eye type structures, the relief depth will typically be in the range 0.05 microns to 0.5 microns. For structures such as those shown in FIGS. 13 *a, b, e, f, h* and *i*, the height or depth of the bumps/recesses is preferably in the range 0.5 to 10 μm and more preferably in the range of 1 to 2 μm. The typical width of the bumps or recesses will be defined by the nature of the artwork but will typically be less than 100 μm, more preferably less than 50 μm and even more preferably less than 25 μm. The size of the image elements and therefore the size of the bumps or recesses will be dependent on factors including the type of optical effect required, the size of the focusing elements and the desired device thickness.

The invention claimed is:

1. A method of making a security device, comprising:
   (a) forming an array of focussing elements on a first region of a first surface of a focussing element support layer, by:
   (a)(i') applying a pedestal layer comprising at least one transparent material onto at least the first region of the first surface of the focussing element support layer;
   (a)(i) applying, after step (a)(i'), at least one transparent curable material either to the pedestal layer or to a casting tool carrying a surface relief corresponding to the focussing elements, over at least the first region;
   (a)(ii) forming, after step (a)(i'), the transparent curable material(s) with the casting tool by bringing the first surface of the focussing element support layer against the casting tool such that the at least one transparent curable material is between the surface relief and the pedestal layer, across at least the first region; and
   (a)(iii) curing, after step (a)(i'), the transparent curable material(s) on the pedestal layer so as to retain the surface relief in the first region;
   wherein the focal length of the focussing elements is such that their focal plane lies either substantially on the first surface of the focussing element support layer, or beyond the first surface of the focussing element support layer relative to the location of the array of focussing elements and
   wherein the at least one transparent material forming the pedestal layer is one of:
   comprised of at least two transparent materials having different optical detection characteristics, the at least two transparent materials being applied to different respective laterally offset sub-regions of the focussing element support layer in the first region; and
   of a first height in a first sub-region of the first region and a second different height in a second sub-region of the first region.

2. A method according to claim 1 wherein the at least one transparent material forming the pedestal layer is elastomeric.

3. A method according to claim 1, wherein the at least one transparent material forming the pedestal layer comprises at least two transparent materials having different optical detection characteristics, the at least two transparent materials being applied to different respective laterally offset sub-regions of the focussing element support layer in the first region, and the different optical detection characteristics are any of: different visible colours, different fluorescence, different luminescence or different phosphorescence.

4. A method according to claim 1, wherein the at least one transparent material forming the pedestal layer comprises at least two transparent materials having different optical detection characteristics, the at least two transparent materials being applied to different respective laterally offset sub-regions of the focussing element support layer in the first region, and wherein the first and second sub-regions individually or collectively define one or more indicia.

5. A method according to claim 1, where in step (a)(i'), the at least one transparent material applied to form the pedestal layer is applied to the first surface of the focussing element support layer as a fluid or gel.

6. A method according to claim 1, wherein in step (a)(i') the pedestal layer is applied by printing or coating the at least one transparent material onto at least the first region of the first surface of the focussing element support layer.

7. A security device, comprising an array of focussing elements formed of at least one curable transparent material disposed across a first region of a focussing element support layer on a first surface thereof, and further comprising a pedestal layer comprising at least one transparent material between the at least one curable transparent material forming the array of focussing elements and the first surface of the focussing element support layer, wherein the focal length of the focussing elements is such that their focal plane lies either substantially on the first surface of the focussing element support layer, or beyond the first surface of the focussing element support layer relative to the location of the array of focussing elements; wherein the at least one transparent material forming the pedestal layer is comprised of at least two transparent materials having different optical detection characteristics, the at least two transparent materials being applied to different respective laterally offset sub-regions of the focussing element support layer in the first region.

8. A security device according to claim 7 wherein the at least one transparent material forming the pedestal layer is elastomeric.

9. A security device according to claim 7, wherein the different optical detection characteristics are any of: different visible colours, different fluorescence, different luminescence or different phosphorescence.

10. A security device according to claim 7, wherein the first and second sub-regions individually or collectively define one or more indicia.

11. A security device according to claim 7, wherein the pedestal layer is a printed or coated layer.

12. A security device according to claim 7, further comprising an image array located in a plane spaced from the array of focussing elements by a distance substantially equal to the focal length of the focussing elements whereby the focussing elements exhibit a substantially focussed image of the image array.

13. A security document, comprising a polymer substrate having first and second surfaces;

an array of focussing elements formed of at least one curable transparent material disposed across a first region of a focussing element support layer on a first surface thereof, and further comprising a pedestal layer comprising at least one transparent material between the at least one curable transparent material forming the array of focussing elements and the first surface of the focussing element support layer, wherein the focal length of the focussing elements is such that their focal plane lies either substantially on the first surface of the focussing element support layer, or beyond the first surface of the focussing element support layer relative to the location of the array of focussing elements, wherein the focussing element support layer is either the polymer substrate or another layer applied thereto; and at least one opacifying layer applied to the first and/or second surface of the polymer substrate, the or each opacifying layer comprising a non-transparent material, wherein at least the opacifying layer(s) on the first surface of the substrate define a gap forming a window region in which at least part of the array of focussing elements is disposed; and wherein the at least one transparent material forming the pedestal layer is comprised of at least two transparent materials having different optical detection characteristics, the at least two transparent materials being applied to different respective laterally offset sub-regions of the focussing element support layer in the first region.

* * * * *